US012647917B2

(12) United States Patent (10) Patent No.: US 12,647,917 B2
Venugopal et al. (45) Date of Patent: Jun. 2, 2026

(54) BEAM-SPECIFIC TIMING PRECOMPENSATION

(71) Applicant: QUALCOMM Incorporated, San Diego, CA (US)

(72) Inventors: Kiran Venugopal, Raritan, NJ (US); Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 533 days.

(21) Appl. No.: 17/569,260

(22) Filed: Jan. 5, 2022

(65) Prior Publication Data

US 2022/0231739 A1    Jul. 21, 2022

Related U.S. Application Data

(60) Provisional application No. 63/138,395, filed on Jan. 16, 2021.

(51) Int. Cl.
*H04W 56/00* (2009.01)
*H04W 72/044* (2023.01)
(Continued)

(52) U.S. Cl.
CPC ..... *H04W 56/004* (2013.01); *H04W 56/0055* (2013.01); *H04W 72/044* (2013.01); *H04B 7/0617* (2013.01); *H04L 5/0048* (2013.01)

(58) Field of Classification Search
CPC .... H04B 7/0617; H04B 7/088; H04B 7/0695; H04L 5/0048; H04W 72/044;
(Continued)

(56) References Cited

U.S. PATENT DOCUMENTS

2017/0149543 A1 * 5/2017 Ang ...................... H04L 5/0053
2021/0184739 A1 * 6/2021 Sang .................... H04L 5/0048
(Continued)

FOREIGN PATENT DOCUMENTS

WO    WO-2020135695 A1    7/2020

OTHER PUBLICATIONS

International Search Report and Written Opinion—PCT/US2022/011443—ISA/EPO—Apr. 19, 2022.
(Continued)

*Primary Examiner* — Omer S Mian
(74) *Attorney, Agent, or Firm* — Loza & Loza, LLP

(57) ABSTRACT

Aspects relate to a user equipment that transmits an uplink transmission on a first receive beam of a first beam pair link and on a second receive beam of a second beam pair link. A base station receives the uplink transmission on a first transmit beam of the first beam pair link and a second transmit beam of the second beam pair link via first and second transmission and reception points associated with the base station. The base station transmits a downlink transmission on the first transmit beam with a first beam-specific timing precompensation and on the second transmit beam with a second beam-specific timing precompensation. The first beam-specific timing precompensation and the second beam-specific timing precompensation are based on a timing difference between the reception of the uplink transmission via the first TRP and via the second TRP. The user equipment receives the beam-specific timing precompensations.

17 Claims, 18 Drawing Sheets

(51) Int. Cl.
　　*H04B 7/06*　　　　(2006.01)
　　*H04L 5/00*　　　　(2006.01)

(58) Field of Classification Search
　　CPC ................. H04W 36/28; H04W 36/18; H04W
　　　　　　　　　36/00692; H04W 56/0045; H04W
　　　　　　　　　　　　　　　　　　　56/0055
　　See application file for complete search history.

(56)　　　　　　　References Cited

U.S. PATENT DOCUMENTS

| | | | |
|---|---|---|---|
| 2021/0328659 A1 | 10/2021 | Luo et al. | |
| 2023/0064231 A1* | 3/2023 | Haghighat | ............ H04L 5/0053 |
| 2023/0308242 A1* | 9/2023 | Ji | ............................. H04B 7/01 |

OTHER PUBLICATIONS

Nokia., et al., "Doppler Compensation, Uplink Timing Advance and Random Access in NTN", 3GPP Draft, 3GPP TSG RAN WG1 #99, R1-1913017, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18-Nov. 22, 2019, Nov. 9, 2019 (Nov. 9, 2019), XP051823750, 29 Pages, Retrieved from the Internet: URL: https://ftp.3gpp.org/tsg_ran/WG1_RL1/TSGR1_99/Docs/R1-1913017.zip R1-1913017. docx [retrieved on Nov. 9, 2019], sections 1-6, figures 1-3, 5-9, The whole document, pp. 1-27.

Qualcomm Incorporated: "SSB Arrangements, BWP Operation and Other Issues for NTN", 3GPP TSG RAN WG1 #102-e, 3GPP Draft, R1-2006807, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17-Aug. 28, 2020, Aug. 8, 2020 (Aug. 8, 2020), 6 Pages, XP051918257, Retrieved from the Internet: URL: https://ftp.3gpp.org/tsg_ran/WG1_RL1/TSGR1_102-e/Docs/R1-2006807.zip, R1-2006807 SSB arrangements, BWP operation and other issues for NTN.docx [retrieved on Aug. 8, 2020], pp. 1-6.

* cited by examiner

| | 1st UE 724 Connected to Adjacent TRPs (1st TRP 706 + 2nd TRP 708) | 1st Delay > 2nd Delay |
|---|---|---|
| CASE 1 | | |
| 701 | | |
| CASE 2 | 1st UE 724 Connected to Adjacent TRPs (1st TRP 706 + 2nd TRP 708) and Non-adjacent TRPs (1st TRP 706 + 3rd TRP 710) | 3rd Delay > 1st Delay > 2nd Delay |
| 703 | | |

700

704

702 Base Station

4th TRP 712

3rd TRP 710

2nd TRP 708

1st TRP 706

3rd BPL 734

2nd BPL 732

1st BPL 730

3rd Delay 744

2nd Delay 742

1st Delay 740

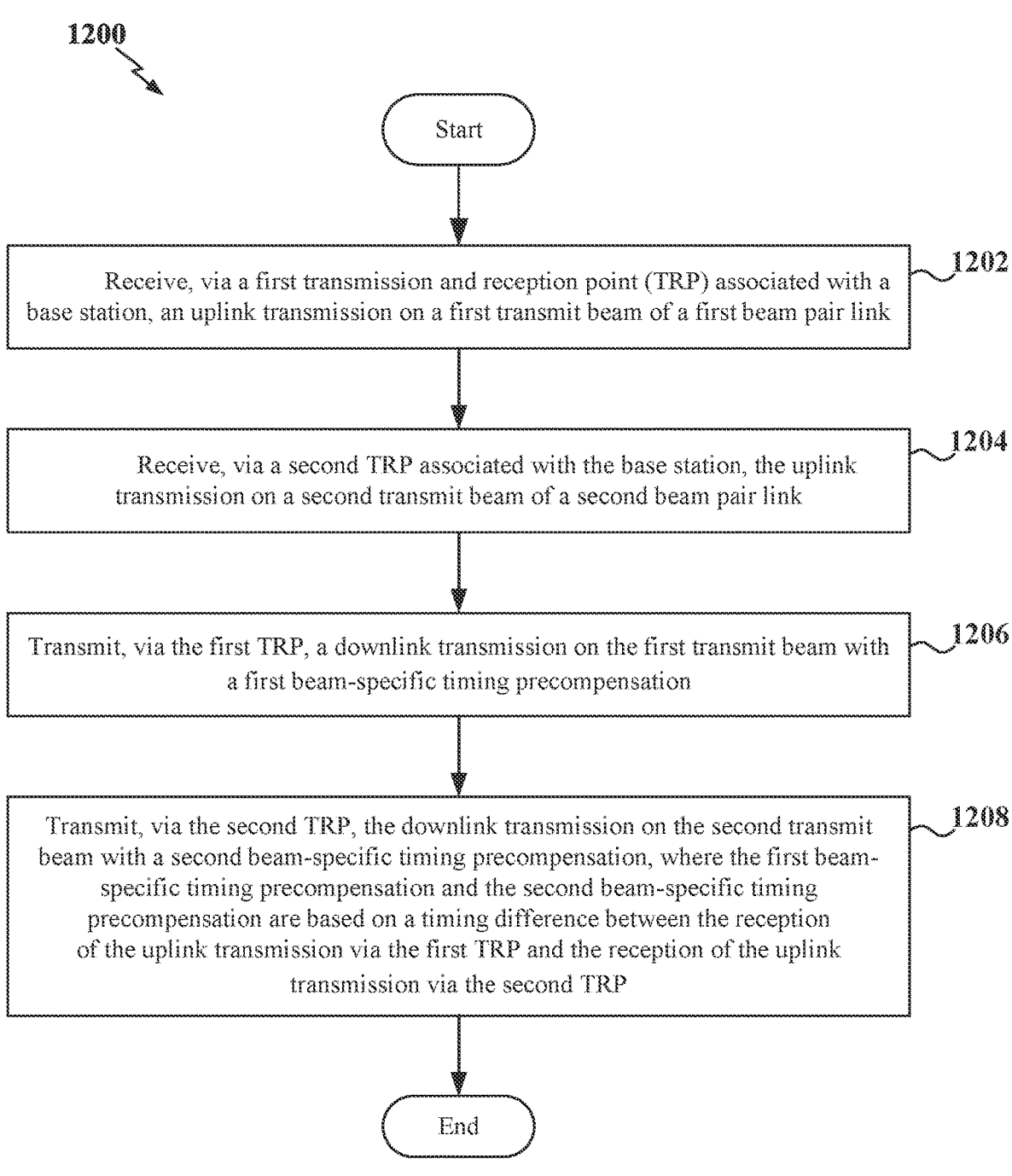

1200

Start

Receive, via a first transmission and reception point (TRP) associated with a base station, an uplink transmission on a first transmit beam of a first beam pair link ⟩ 1202

Receive, via a second TRP associated with the base station, the uplink transmission on a second transmit beam of a second beam pair link ⟩ 1204

Transmit, via the first TRP, a downlink transmission on the first transmit beam with a first beam-specific timing precompensation ⟩ 1206

Transmit, via the second TRP, the downlink transmission on the second transmit beam with a second beam-specific timing precompensation, where the first beam-specific timing precompensation and the second beam-specific timing precompensation are based on a timing difference between the reception of the uplink transmission via the first TRP and the reception of the uplink transmission via the second TRP ⟩ 1208

End

FIG. 12

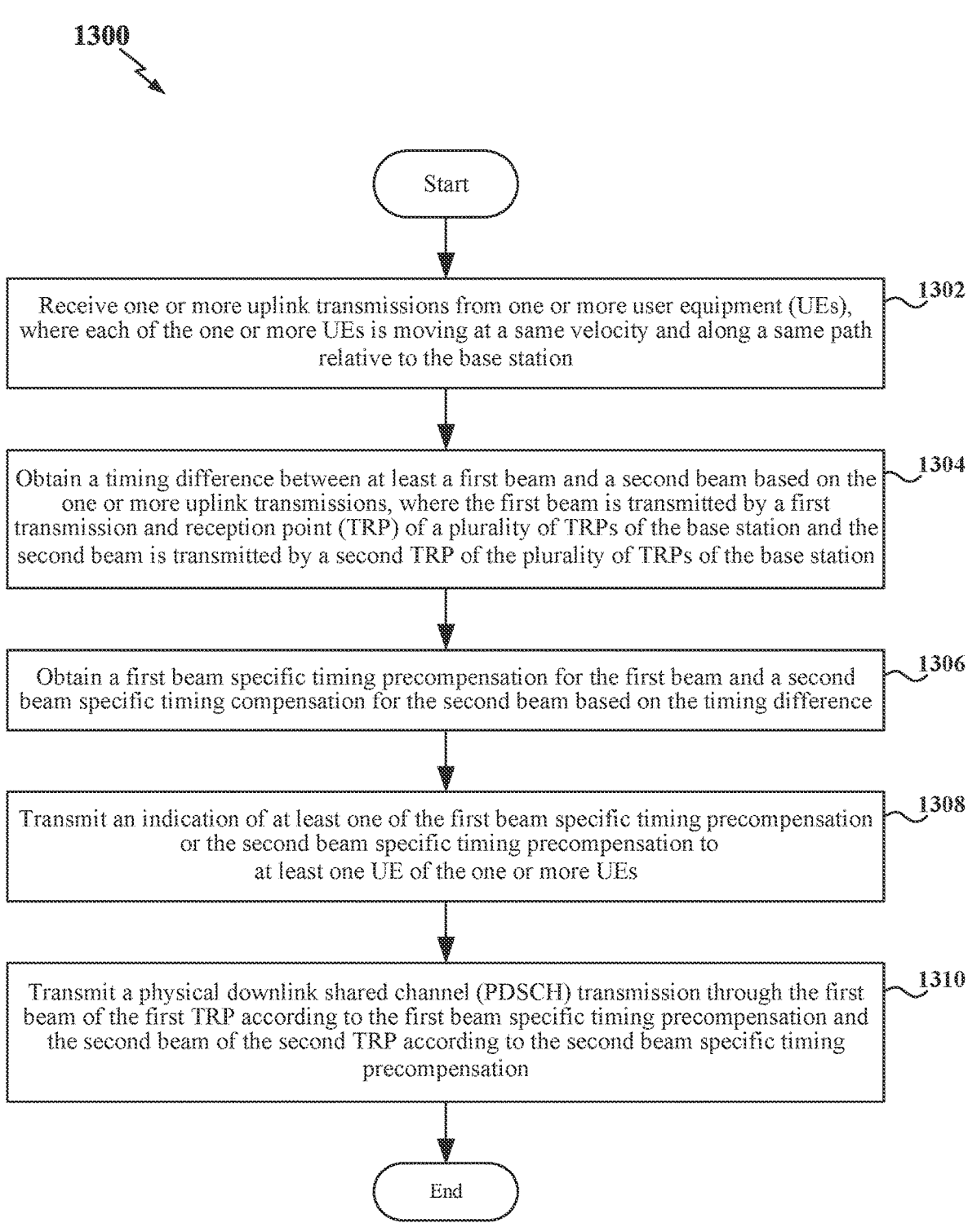

1300

Start

Receive one or more uplink transmissions from one or more user equipment (UEs), where each of the one or more UEs is moving at a same velocity and along a same path relative to the base station ⟩1302

Obtain a timing difference between at least a first beam and a second beam based on the one or more uplink transmissions, where the first beam is transmitted by a first transmission and reception point (TRP) of a plurality of TRPs of the base station and the second beam is transmitted by a second TRP of the plurality of TRPs of the base station ⟩1304

Obtain a first beam specific timing precompensation for the first beam and a second beam specific timing compensation for the second beam based on the timing difference ⟩1306

Transmit an indication of at least one of the first beam specific timing precompensation or the second beam specific timing precompensation to at least one UE of the one or more UEs ⟩1308

Transmit a physical downlink shared channel (PDSCH) transmission through the first beam of the first TRP according to the first beam specific timing precompensation and the second beam of the second TRP according to the second beam specific timing precompensation ⟩1310

End

FIG. 13

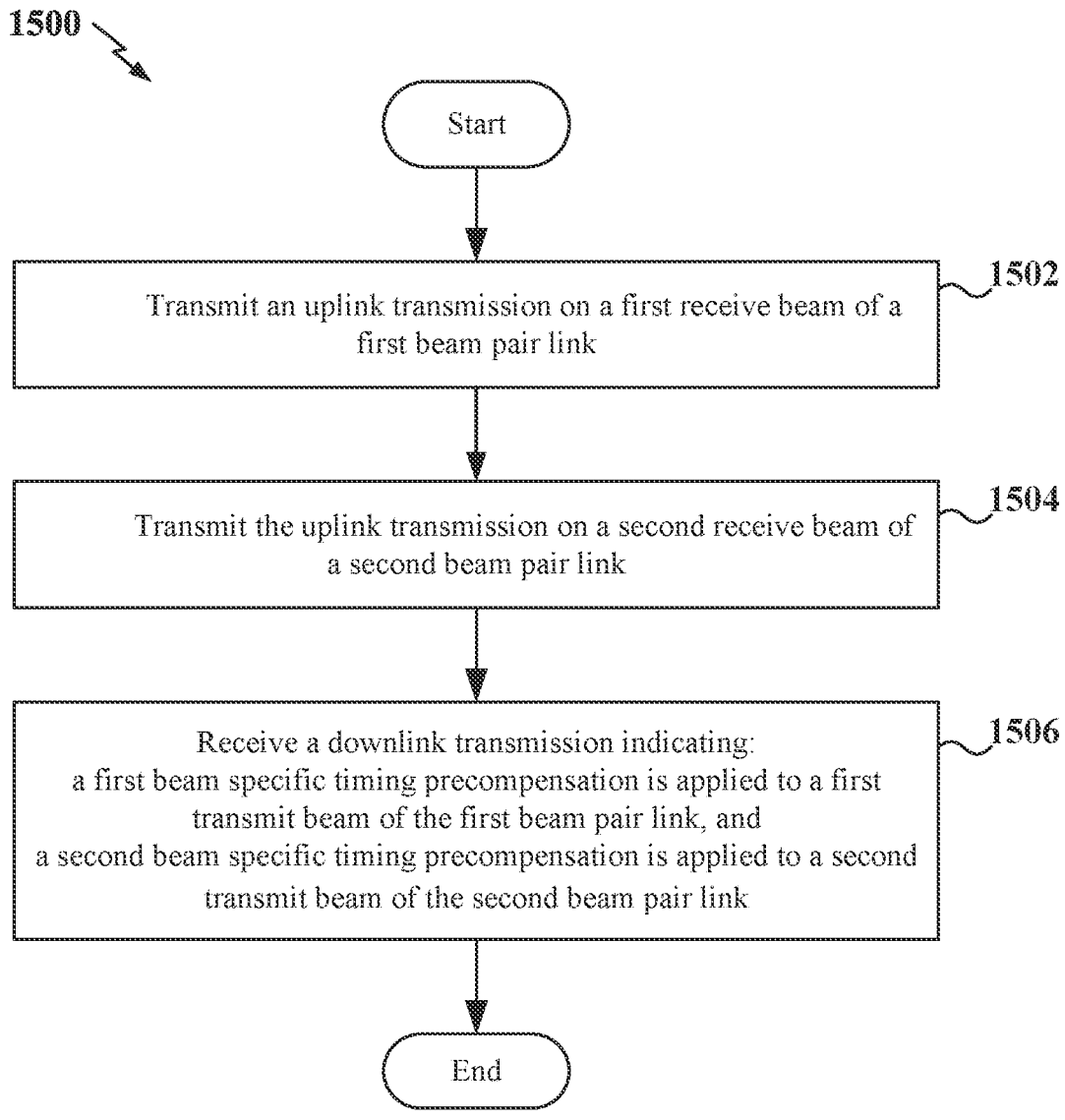

1500

Start

Transmit an uplink transmission on a first receive beam of a first beam pair link ⟶ 1502

Transmit the uplink transmission on a second receive beam of a second beam pair link ⟶ 1504

Receive a downlink transmission indicating:
a first beam specific timing precompensation is applied to a first transmit beam of the first beam pair link, and
a second beam specific timing precompensation is applied to a second transmit beam of the second beam pair link ⟶ 1506

End

FIG. 15

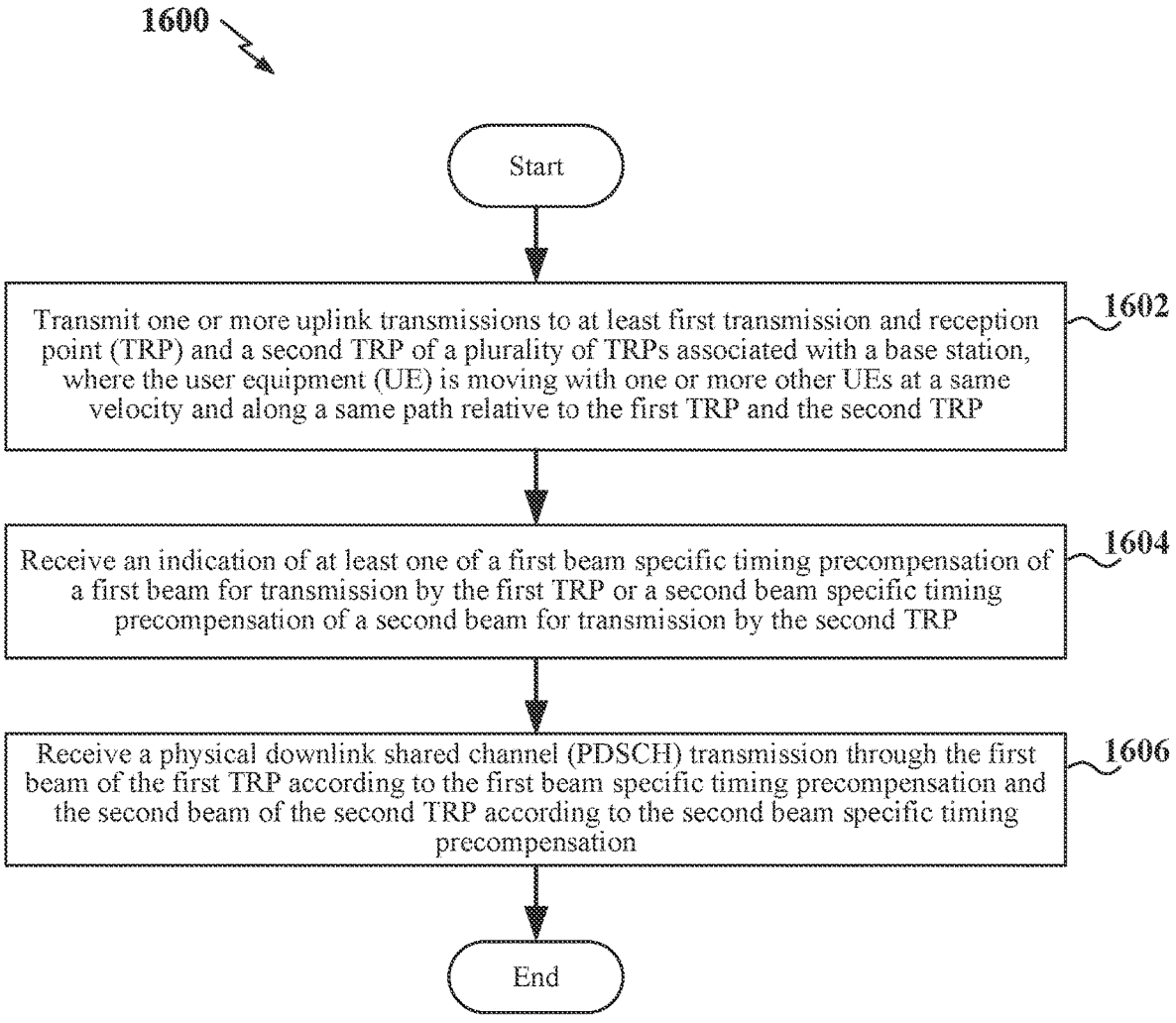

1600

Start

Transmit one or more uplink transmissions to at least first transmission and reception point (TRP) and a second TRP of a plurality of TRPs associated with a base station, where the user equipment (UE) is moving with one or more other UEs at a same velocity and along a same path relative to the first TRP and the second TRP          1602

Receive an indication of at least one of a first beam specific timing precompensation of a first beam for transmission by the first TRP or a second beam specific timing precompensation of a second beam for transmission by the second TRP          1604

Receive a physical downlink shared channel (PDSCH) transmission through the first beam of the first TRP according to the first beam specific timing precompensation and the second beam of the second TRP according to the second beam specific timing precompensation          1606

End

FIG. 16

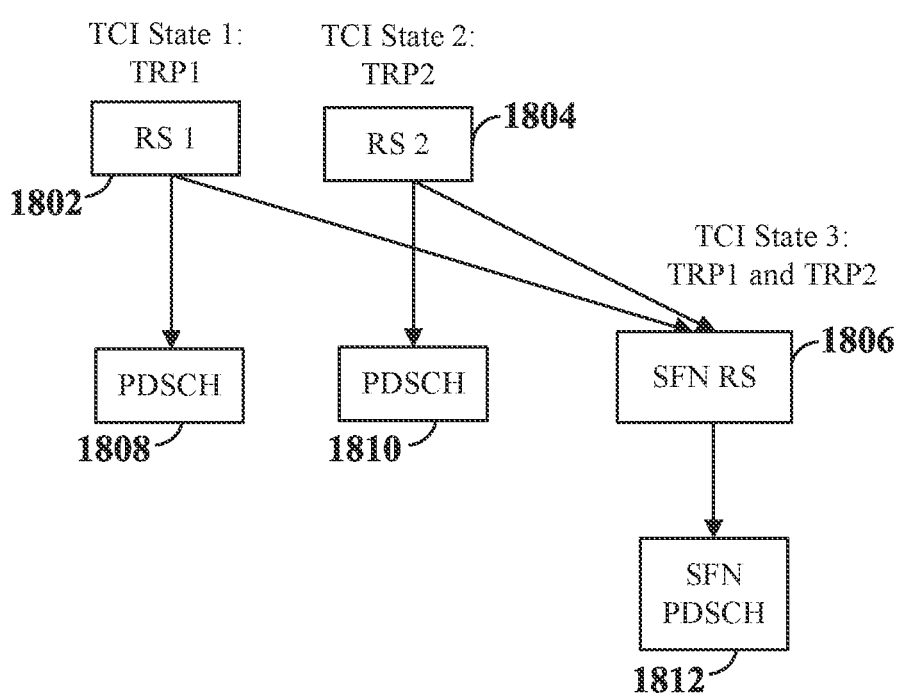
FIG. 18

BEAM-SPECIFIC TIMING PRECOMPENSATION

CLAIM OF PRIORITY UNDER 35 U.S.C. § 119

The present Application for Patent claims priority to pending application No. 63/138,395 titled "Beam-specific Delay Pre-Compensation for High-Speed Train Single Frequency Network" filed in the United States Patent and Trademark Office on Jan. 16, 2021, and assigned to the assignee hereof and hereby expressly incorporated by reference herein as if fully set forth below and for all applicable purposes.

TECHNICAL FIELD

The technology discussed below relates generally to wireless communication systems utilizing beam-specific timing precompensation.

INTRODUCTION

High-speed trains (HSTs) may utilize single frequency networks (SFN) to facilitate wireless communication. A user equipment (UE) located within an HST moves in a predefined path or trajectory (e.g., where the path/trajectory follows a train track) and at velocities exceeding 300 kilometers per hour. Remote radio heads or transmission and reception points (TRPs) may be deployed along the predefined path and associated with a base station. In SFNs, multiple TRPs may serve a single UE and transmit on the same time-frequency resource. Because of densification, SFN may be used to provide spatial diversity gain, where adjacent TRPs transmit the same data in a same time-frequency resource to provide the UE with a signal (carrying the data) from multiple TRPs simultaneously.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication at a base station is disclosed. The method includes receiving, via a first transmission and reception point (TRP) associated with the base station, an uplink transmission on a first transmit beam of a first beam pair link; receiving, via a second TRP associated with the base station, the uplink transmission on a second transmit beam of a second beam pair link; transmitting, via the first TRP, a downlink transmission on the first transmit beam with a first beam-specific timing precompensation; and transmitting, via the second TRP, the downlink transmission on the second transmit beam with a second beam-specific timing precompensation, wherein the first beam-specific timing precompensation and the second beam-specific timing precompensation are based on a timing difference between the reception of the uplink transmission via the first TRP and the reception of the uplink transmission via the second TRP.

In another example, a base station for wireless communication is disclosed. The base station includes a transceiver, a memory, and a processor communicatively coupled to the transceiver and the memory. In the example, the processor and the memory are configured to: receive, via a first transmission and reception point (TRP) associated with the base station, an uplink transmission on a first transmit beam of a first beam pair link; receive, via a second TRP associated with the base station, the uplink transmission on a second transmit beam of a second beam pair link, transmit, via the first TRP, a downlink transmission on the first transmit beam with a first beam-specific timing precompensation; and transmit, via the second TRP, the downlink transmission on the second transmit beam with a second beam-specific timing precompensation, where the first beam-specific timing precompensation and the second beam-specific timing precompensation are based on a timing difference between the reception of the uplink transmission via the first TRP and the reception of the uplink transmission via the second TRP.

In another example, a method of wireless communication at a user equipment (UE) is disclosed. According to the example, the method includes: transmitting an uplink transmission on a first receive beam of a first beam pair link; transmitting the uplink transmission on a second receive beam of a second beam pair link; and receiving a downlink transmission indicating: a first beam-specific timing precompensation that is applied to a first transmit beam of the first beam pair link, and a second beam-specific timing precompensation that is applied to a second transmit beam of the second beam pair link.

In an additional example, a user equipment (UE) for wireless communication is disclosed. The UE includes a transceiver, a memory, and a processor communicatively coupled to the transceiver and the memory. In the example, the processor and the memory are configured to: transmit an uplink transmission on a first receive beam of a first beam pair link; transmit the uplink transmission on a second receive beam of a second beam pair link, and receive a downlink transmission indicating: a first beam-specific timing precompensation that is applied to a first transmit beam of the first beam pair link, and a second beam-specific timing precompensation that is applied to a second transmit beam of the second beam pair link.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIG. 9 is a signaling diagram illustrating exemplary signaling for beam-specific timing precompensation according to some aspects.

FIG. 12 is a flow chart of a method of wireless communication utilizing beam-specific timing precompensation according to some aspects.

FIG. 13 is a flow chart of a method of wireless communication utilizing beam-specific timing precompensation according to some aspects.

FIG. 15 is a flow chart of a method of wireless communication utilizing beam-specific timing precompensation according to some aspects.

FIG. 16 is a flow chart of a method of wireless communication utilizing beam-specific timing precompensation according to some aspects.

FIG. 18 is an illustration of a single frequency network configuration according to some aspects.

DETAILED DESCRIPTION

Figure 1:
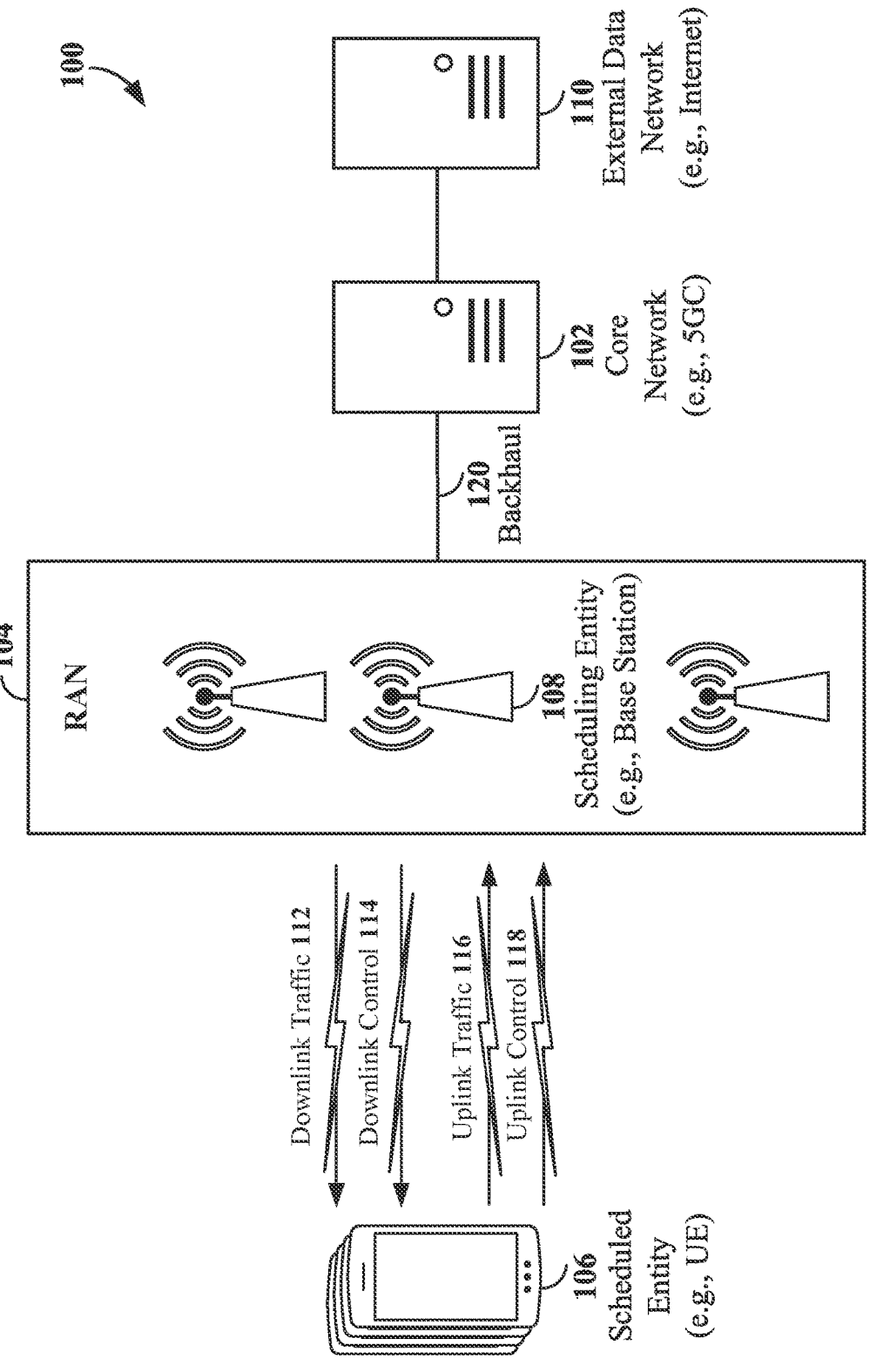
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, radio frequency (RF) chains (RF-chains), power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station (e.g., gNode B (gNB)) may provide a UE with a set of transmission configuration indication (TCI) state configurations via radio resource control (RRC) messages. Each TCI state may include quasi co-location (QCL) information indicating one or more downlink reference signals from which various radio channel properties of downlink channels or downlink signals may be inferred. An example of QCL information includes QCL-TypeD, which indicates a spatial property of a beam (e.g., a beam direction and/or beam width) associated with a particular downlink reference signal. From the QCL-TypeD information, the UE may infer the beam on which a downlink channel or downlink signal may be communicated.

Examples of uplink channels include physical uplink shared channel (PUSCH), physical uplink control channel (PUCCH), and physician random-access channel (PRACH). Examples of downlink channels include physical downlink shared channel (PDSCH), physical downlink control channel (PDCCH), and physical broadcast channel (PBCH). Examples of uplink signals include demodulation reference signal (DM-RS) (for PUSCH and PUCCH), phase-tracking reference signal (PT-RS) (for PUSCH), and sounding reference signal (SRS). Examples of downlink signals include demodulation reference signal (DM-RS) (for PDSCH, PDCCH, and PBCH), synchronization signal (e.g., PSS and/or SSS), phase-tracking reference signal (PT-RS) (for PDSCH), and channel-state information (CSI) reference signal (CSI-RS). Once these TCI state configurations are provided to the UE, a gNB may activate or deactivate the provided TCI states for a given UE by transmitting, for example, a medium access control (MAC) control element (MAC-CE). This MAC-CE is identified by a MAC subheader that includes a serving cell ID, a bandwidth part (BWP) ID, and a parameter Ti that indicates the activation or deactivation status of the TCI state with TCI-StateId i. Here, i is an integer index value that indexes the list of TCI states previously provided to the UE. The base station may then select one of the activated TCI states to communicate a downlink channel or downlink signal to the UE. For example, the base station may indicate a particular TCI state for a downlink channel or signal within downlink control information (DCI) scheduling the downlink channel or signal.

High-speed trains (HSTs) may utilize single frequency networks (SFN) to facilitate wireless communication. In SFNs, multiple transmission reception points (TRPs) of a base station, which may be deployed, for example, in a remote radio head (RRH) configuration, may serve a UE and transmit the same downlink channels and signals to the UE on the same time-frequency resource. The base station may configure each TRP to utilize a different beam (e.g., different TCI state) associated with that TRP to transmit the downlink channel or signal to the UE. However, due to the different TRP locations relative to the UE and the different paths based on the different beams, the transmissions from each of the TRPs may arrive at the UE at different times, which may increase the delay spread, resulting in inter-symbol interference (ISI).

Therefore, aspects described herein include a UE transmitting one or more uplink transmissions to a base station through a plurality of transmission and reception points (TRP) associated with the base station while the UE is within a moving vehicle in an SFN. According to some aspects, the vehicle may be a high-speed train. The base station may receive an uplink transmission from the UE at a plurality of TRPs and, from a determination of the timing differences of the received uplink transmission at the respective TRPs, may obtain (e.g., estimate, calculate, determine, derive) a timing difference between the timing of a downlink transmission to the UE on a first beam of a first TRP and the same downlink transmission to the same UE on a second beam of a second TRP. Based on the timing difference, the base station may then determine a first beam-specific timing precompensation for the first beam and a second beam-specific timing precompensation for the second beam. Subsequently, the base station may transmit an indication of at least one of the first beam-specific timing precompensation or the second beam-specific timing precompensation to the LE. Then the base station may transmit a physical downlink shared channel (PDSCH) transmission to the UE through the first beam of the first TRP according to the first beam-specific timing precompensation and through the second beam of the second TRP according to the second beam-specific timing precompensation.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, TX chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control 114 information, including but not limited to scheduling information (e.g., a grant), synchronization or timing information, or other control information from another entity in the wireless communication network such as the scheduling entity 108. The scheduled entity (e.g., a UE 106) may transmit uplink control 118 information including one or more uplink control channels to the scheduling entity 108. Uplink control 118 information may include a variety of packet types and categories, including pilots, reference signals, and information configured to enable or assist in decoding uplink data transmissions.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
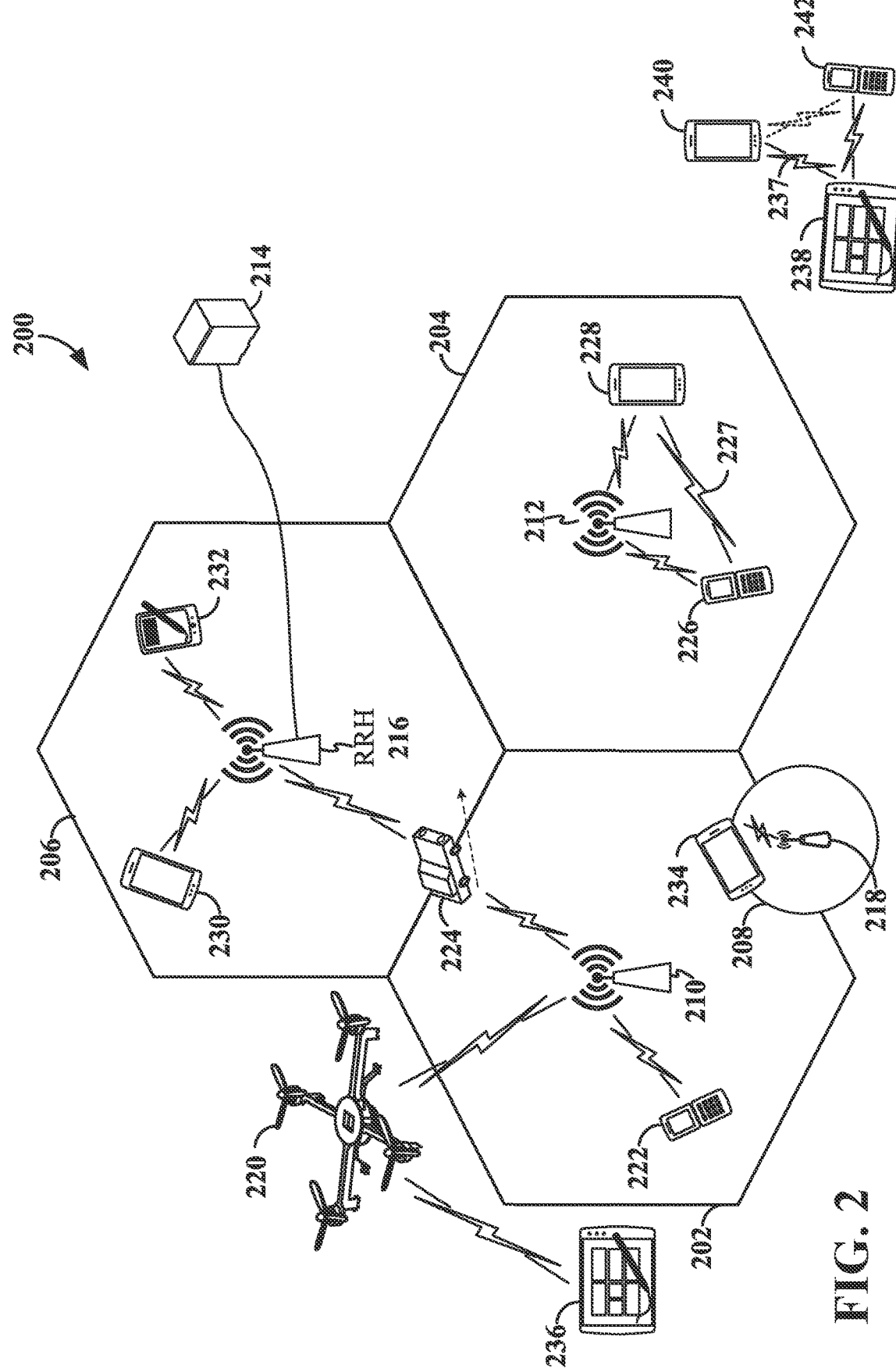
FIG. 2 is a schematic illustration of an example of a radio access network (RAN) according to some aspects.

Referring now to FIG. 2, as an illustrative example without limitation, a schematic illustration of an example of a radio access network (RAN) 200 according to some aspects of the disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214, is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an orthogonal frequency division multiplexing (OFDM) waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
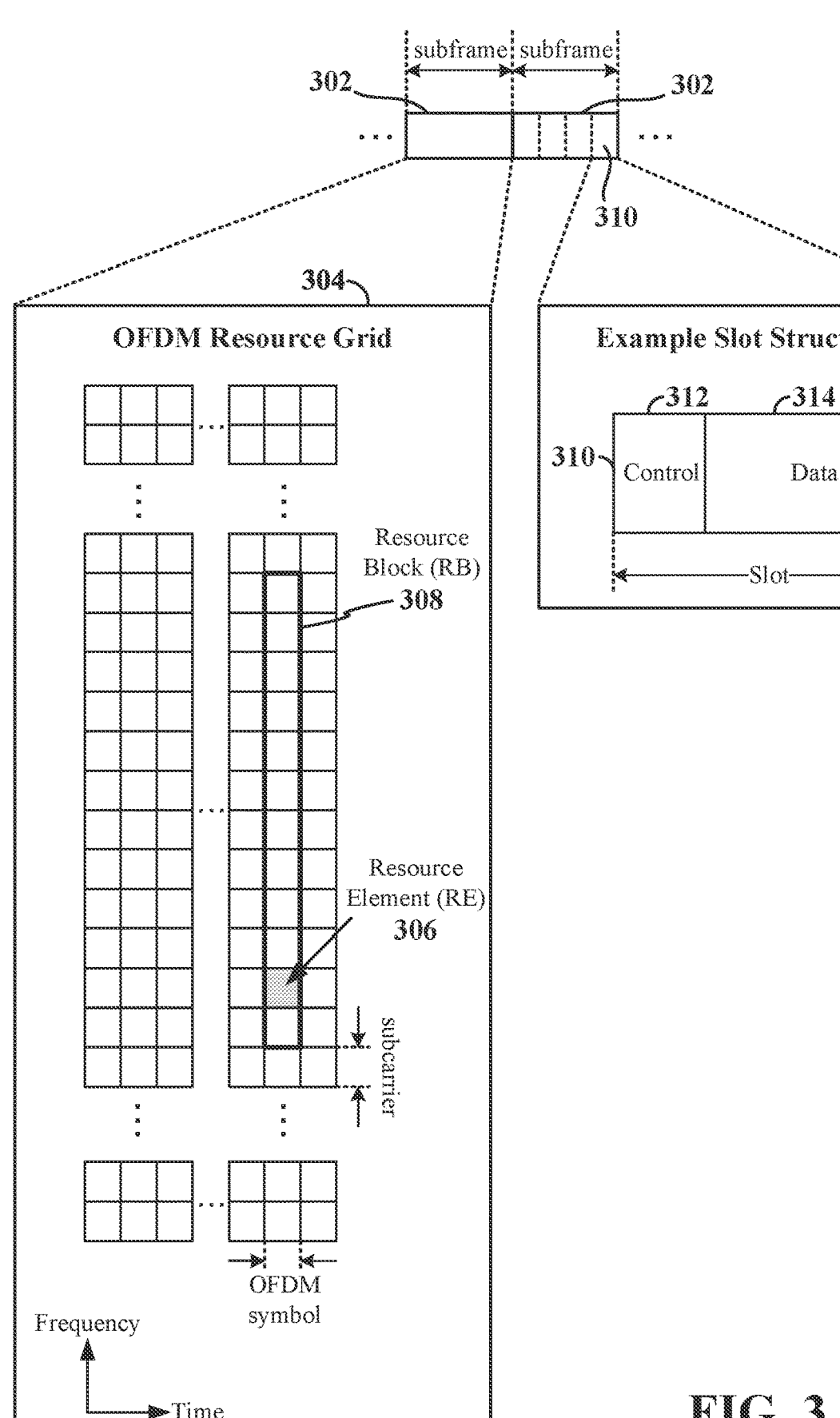
FIG. 3 is a schematic illustration of wireless resources in an air interface utilizing orthogonal frequency division multiplexing (OFDM) according to some aspects.

Referring now to FIG. 3, an expanded view of an exemplary subframe 302 is illustrated, showing an OFDM resource grid. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DM-RS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to can-y UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DM-RS. In some examples, the UCI may include a scheduling request (SR). i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DM-RSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
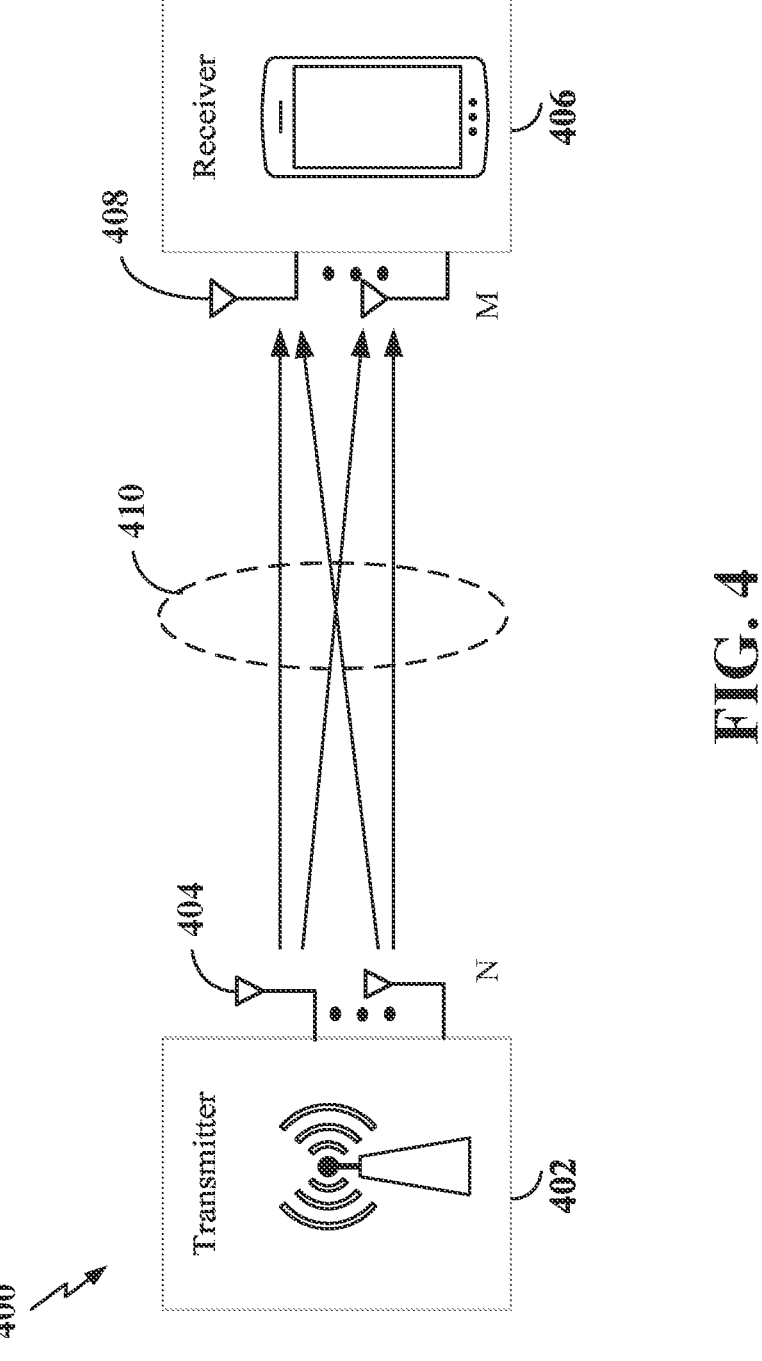
FIG. 4 is a diagram illustrating an example of a wireless communication system supporting beamforming and/or multiple-input multiple-output (MIMO) according to some aspects.

In some aspects of the disclosure, the scheduling entity and/or scheduled entity may be configured for beamforming and/or multiple-input multiple-output (MIMO) technology. FIG. 4 is a diagram illustrating an example of a wireless communication system 400 supporting beamforming and/or multiple-input multiple-output (MIMO) according to some aspects. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. The multiple transmit antennas 404 and multiple receive antennas 408 may each be configured in a single panel or multi-panel antenna array. Each of the transmitter 402 and the receiver 406 may be implemented, for example, within a scheduling entity (e.g., base station 108), as illustrated in FIGS. 1 and/or 2, a scheduled entity (e.g., UE 106), as illustrated in FIGS. 1 and/or 2, or any other suitable wireless communication device.

The use of such multiple antenna technology enables the wireless communication system 400 to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system (e.g., the wireless communication system 400 supporting MIMO) is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a sounding reference signal (SRS) transmitted from the UE or other pilot signal). Based on the assigned rank, the base station may then transmit a channel state information-reference signal (CSI-RS) with separate CSI-RS sequences for each layer to provide for multi-layer channel estimation. From the CSI-RS, the UE may measure the channel quality across layers and resource blocks and feed back channel quality indicator (CQI) and rank indicator (RI) values to the base station for use in updating the rank and assigning REs for future downlink transmissions.

In one example, as shown in FIG. 4, a rank-2 spatial multiplexing transmission on a 2×2 MIMO antenna configuration will transmit one data stream from each of the transmit antennas 404. Each data stream reaches each of the receive antennas 408 along a different one of the signal paths 410. The receiver 406 may then reconstruct the data streams using the received signals from each of the receive antennas 408.

Beamforming is a signal processing technique that may be used at the transmitter 402 or receiver 406 to shape or steer an antenna beam (e.g., a transmit/receive beam) along a spatial path between the transmitter 402 and the receiver 406. Beamforming may be achieved by combining the signals communicated via antennas 404 or 408 (e.g., antenna elements of an antenna array) such that some of the signals experience constructive interference while others experience destructive interference. To create the desired constructive/ destructive interference, the transmitter 402 or receiver 406 may apply amplitude and/or phase offsets to signals transmitted or received from each of the antennas 404 or 408 associated with the transmitter 402 or receiver 406.

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station.

In some examples, to select one or more serving beams (e.g., one or more downlink transmit beams and one or more downlink receive beams) for communication with a UE, the base station may transmit a reference signal, such as a synchronization signal block (SSB), a tracking reference signal (TRS), or a channel state information reference signal (CSI-RS), on each of a plurality of beams (e.g., on each of a plurality of downlink transmit beams) in a beam-sweeping manner. The UE may measure the reference signal received power (RSRP) on each of the beams (e.g., measure RSRP on each of the plurality of downlink transmit beams) and transmit a beam measurement report to the base station indicating the Layer 1 RSRP (L–1 RSRP) of each of the measured beams. The base station may then select the serving beam(s) for communication with the UE based on the beam measurement report. In other examples, when the channel is reciprocal, the base station may derive the particular beam(s) (e.g., the particular downlink beam(s)) to communicate with the UE based on uplink measurements of one or more uplink reference signals, such as a sounding reference signal (SRS).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

In 5G New Radio (NR) systems, particularly for above 6 GHz or millimeter wave (mmWave) systems, beamformed signals may be utilized for downlink channels, including the physical downlink control channel (PDCCH) and physical downlink shared channel (PDSCH). In addition, for UEs configured with beamforming antenna array modules, beamformed signals may also be utilized for uplink channels, including the physical uplink control channel (PUCCH) and the physical uplink shared channel (PUSCH). However, it should be understood that beamformed signals may also be utilized by, for example, enhanced mobile broadband (eMBB) gNBs for sub 6 GHz systems.

Figure 5:
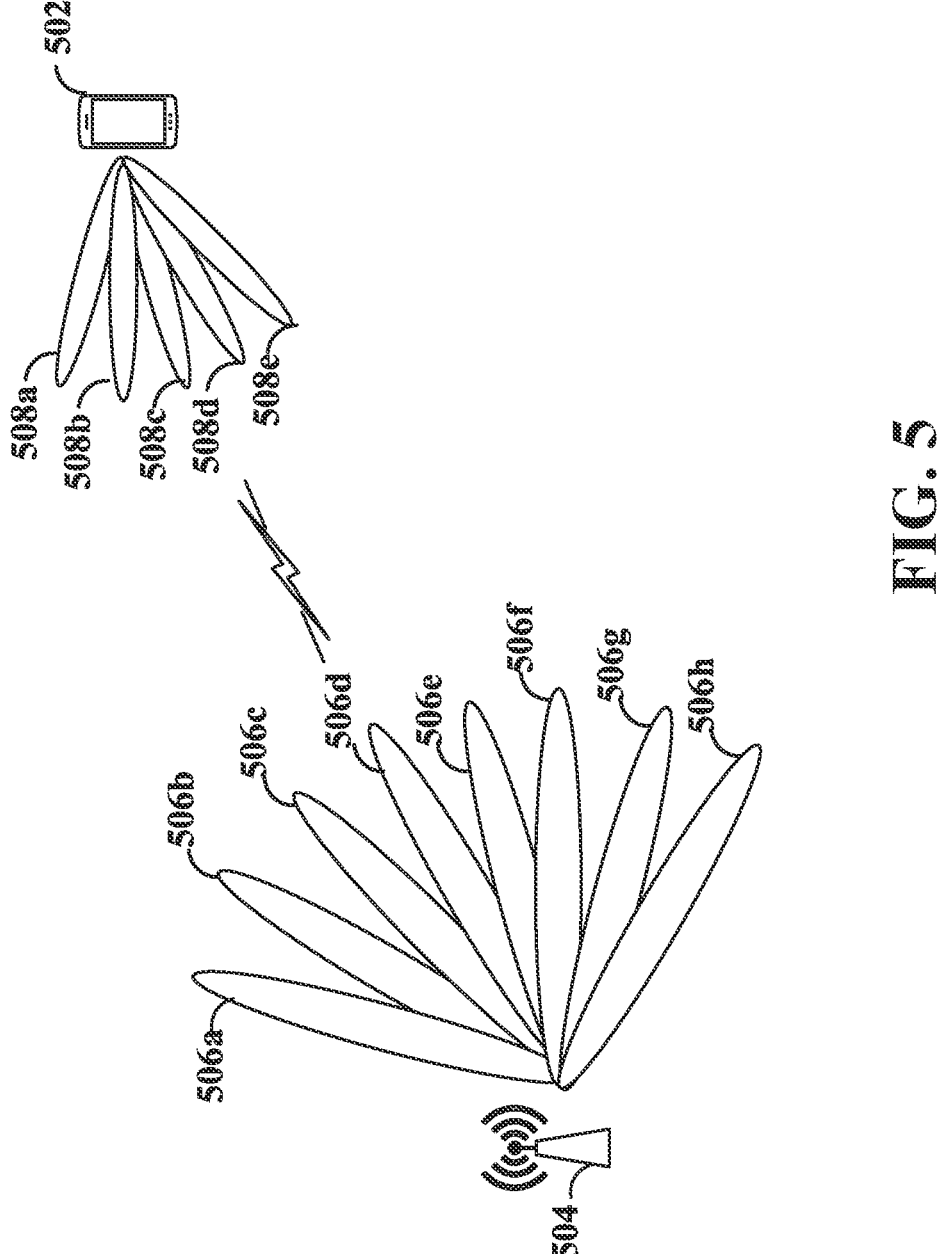
FIG. 5 is a diagram illustrating an example of communication between a base station and a UE using beamforming according to some aspects.

FIG. 5 is a diagram illustrating an example of communication between a base station 504 and a UE 502 using beamforming according to some aspects. The base station 504 may be any of the base stations (e.g., gNBs) or scheduling entities illustrated in FIG. 1, 2, or 4, and the UE 502 may be any of the UEs or scheduled entities illustrated in FIG. 1, 2, or 4.

The base station 504 may generally be capable of communicating with the UE 502 using one or more transmit beams, and the UE 502 may further be capable of communicating with the base station 504 using one or more receive beams. As used herein, the term transmit beam refers to a beam on the base station 504 that may be utilized for downlink or uplink communication with the UE 502. In addition, the term receive beam refers to a beam on the UE 502 that may be utilized for downlink or uplink communication with the base station 504.

In the example shown in FIG. 5, the base station 504 is configured to generate a plurality of transmit beams 506a, 506b, 506c, 506d, 506e, 506f, 506g, and 506h (506a-506h), each associated with a different spatial direction. In addition, the UE 502 is configured to generate a plurality of receive beams 508a, 508b, 508c. 508d, and 508e (508a-508e), each associated with a different spatial direction. It should be noted that while some beams are illustrated as adjacent to one another, such an arrangement may be different in different aspects. For example, transmit beams 506a-506h transmitted during a same symbol may not be adjacent to one another. In some examples, the base station 504 and UE 502 may each transmit more or less beams distributed in all directions (e.g., 360 degrees) and in three-dimensions. In addition, the transmit beams 506a-506h may include beams of varying beam width. For example, the base station 504 may transmit certain signals (e.g., synchronization signal blocks (SSBs)) on wider beams and other signals (e.g., CSI-RSs) on narrower beams.

The base station 504 and UE 502 may select one or more transmit beams 506a-506h on the base station 504 and one or more receive beams 508a-508e on the UE 502 for communication of uplink and downlink signals therebetween using a beam management procedure. In one example, during an initial cell acquisition, the UE 502 may perform a P1 beam management procedure to scan the plurality of transmit beams 506a-506h using the plurality of receive beams 508a-508e to select a beam pair link (e.g., one of the transmit beams 506a-506h and one of the receive beams 508a-508e) for a physical random access channel (PRACH) procedure for initial access to the cell. For example, periodic SSB beam sweeping may be implemented on the base station 504 at certain intervals (e.g., based on the SSB periodicity). Thus, the base station 504 may be configured to sweep or transmit an SSB on each of a plurality of wider transmit beams 506a-506h during the beam sweeping interval. The UE 502 may measure the reference signal received power (RSRP) of each of the SSB transmitted on each of the transmit beams 506a-506h on each of the receive beams 508a-508e of the UE 502. The UE 502 may select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the base station 504 and UE 502 may perform a P2 beam management procedure for beam refinement at the base station 504. For example, the base station 504 may be configured to sweep or transmit a CSI-RS on each of a plurality of narrower transmit beams 506a-506h. Each of the narrower CSI-RS beams may be a sub-beam (not shown) of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/ deactivated via medium access control-control element (MAC-CE) signaling by the gNB), or aperiodically (e.g., as triggered by the gNB via downlink control information (DCI)). The UE 502 may be configured to scan the plurality of CSI-RS transmit beams 506a-506h on the plurality of receive beams 508a-508e. The UE 502 may then perform beam measurements (e.g., measurements of RSRP, SINR, etc.) of the received CSI-RSs on each of the receive beams 508a-508e to determine the respective beam quality of each of the CSI-RS transmit beams 506a-506h as measured on each of the receive beams 508a-508e.

The UE 502 can then generate and transmit a Layer 1 (L1) measurement report, including the respective beam index (e.g., CSI-RS resource indicator (CR1)) and beam measurement (e.g., RSRP or SINR) of one or more of the CSI-RS transmit beams 506a-506h on one or more of the receive beams 508a-508e to the base station 504. The base station 504 may then select one or more CSI-RS transmit beams on which to communicate downlink and/or uplink control and/or data with the UE 502. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 502 may further select a corresponding receive beam on the UE 502 for each selected serving CSI-RS transmit beam to form a respective beam pair link (BPL) for each selected serving CSI-RS transmit beam. For example, the UE 502 may utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the base station 504 may configure the UE 502 to perform SSB beam measurements and provide an L1 measurement report including beam measurements of SSB transmit beams 506a-506h. For example, the base station 504 may configure the UE 502 to perform SSB beam measurements and/or CSI-RS beam measurements for beam failure detection (BFD), beam failure recovery (BFR), cell reselection, beam tracking (e.g., for a mobile UE 502 and/or base station 504), or other beam optimization purpose.

In addition, when the channel is reciprocal, the transmit and receive beams may be selected using an uplink beam management scheme. In an example, the UE 502 may be configured to sweep or transmit on each of a plurality of receive beams 508a-508e. For example, the UE 502 may transmit an SRS on each beam in the different beam directions. In addition, the base station 504 may be configured to receive the uplink beam reference signals on a plurality of transmit beams 506a-506h. The base station 504 may then perform beam measurements (e.g., RSRP, SINR, etc.) of the beam reference signals on each of the transmit beams 506a-506h to determine the respective beam quality of each of the receive beams 508a-508e as measured on each of the transmit beams 506a-506h.

The base station 504 may then select one or more transmit beams on which to communicate downlink and/or uplink control and/or data with the UE 502. In some examples, the selected transmit beam(s) may have the highest RSRP. The UE 502 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., transmit beam 506*d*) on the base station 504 and a single receive beam (e.g., receive beam 508*c*) on the UE 502 may form a single BPL used for communication between the base station 504 and the UE 502. In another example, multiple CSI-RS transmit beams (e.g., transmit beams 506*c*, 506*d*, and 506*e*) on the base station 504 and a single receive beam (e.g., receive beam 508*c*) on the UE 502 may form respective BPLs used for communication between the base station 504 and the UE 502. In another example, multiple CSI-RS transmit beams (e.g., transmit beams 506*c*, 506*d*, and 506*e*) on the base station 504 and multiple receive beams (e.g., receive beams 508*c* and 508*d*) on the UE 502 may form multiple BPLs used for communication between the base station 504 and the UE 502. In this example, a first BPL may include transmit beam 506*c* and receive beam 508*c*, a second BPL may include transmit beam 508*d* and receive beam 508*c*, and a third BPL may include transmit beam 508*e* and receive beam 508*d*.

The channels or carriers described herein are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

High-speed trains (HSTs) may utilize single frequency networks (SFN) to facilitate wireless communication. A user equipment (UE) located within an HST may move in a predefined path or trajectory (e.g., where a train track defines the predefined path or trajectory) at velocities exceeding 300 kilometers per hour. Remote radio heads or transmission and reception points (TRPs) may be deployed along the predefined path and associated with a base station. In SFNs, multiple TRPs may serve a single UE and transmit on the same time-frequency resource. Because of densification, SFN may be used to provide spatial diversity gain, where adjacent TRPs transmit the same data in a same time-frequency resource to provide the UE with a signal (carrying the data) from multiple TRPs simultaneously. However, due to the different TRP locations relative to the UE and the different paths based on the different beams, the transmissions from each of the TRPs may arrive at the UE at different times, which may increase the delay spread, resulting in inter-symbol interference (ISI).

Figure 6:
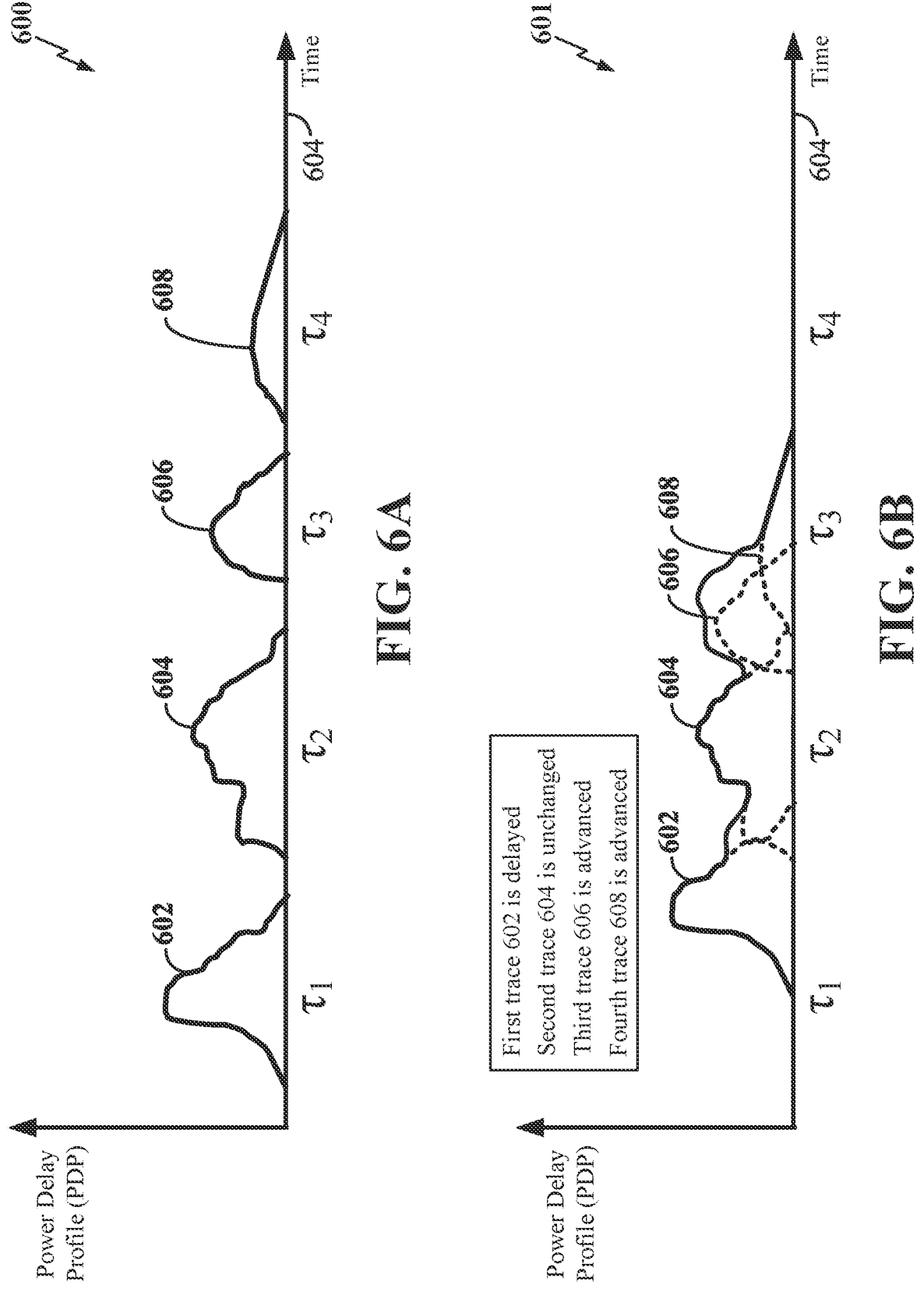
FIG. 6A is a graph of an uncompensated effective power delay profile (PDP) over a plurality of delay locations in time, without beam-specific timing precompensation according to some aspects.
FIG. 6B is a graph of the precompensated effective power delay profile (PDP) over the plurality of delay locations in time, with beam-specific timing precompensation according to some aspects.

FIG. 6A is a graph of an uncompensated effective power delay profile (PDP) 600 over a plurality of delay locations in time, without beam-specific timing precompensation according to some aspects. FIG. 6B is a graph of the precompensated effective power delay profile (PDP) 601 over the plurality of delay locations in time, with beam-specific timing precompensation according to some aspects. In the examples of FIGS. 6A and 6B, power delay profile (PDP) is illustrated along the vertical axis in units of power (e.g., mW, dBm), while the plurality of delay locations are illustrated along the horizontal axis in units of time (e.g., $\tau 1$, $\tau 2$, $\tau 3$, $\tau 4$). The uncompensated effective PDP 600 and the timing precompensated effective PDP 601 illustrate the PDPs at the receiver of one UE. The first PDP trace 602 centered at $\tau 1$, the second PDP trace 604 centered at $\tau 2$, the third PDP trace 606 centered at $\tau 3$, and the fourth PDP trace

608 centered at $\tau 4$ correspond to the transmission of the same downlink channel (or the same signal) from four respective TRPs.

The shape of each PDP trace may be a function of respective beam pair link characteristics (e.g., gain, width, etc.), where each respective beam pair link is directed between the respective TRPs and the UE. The shape of each PDP trace may also be a function of the beam weights used by the UE and the TRPs. FIGS. 6A and 6B may represent a large time-domain window (e.g., a window that spans from less than from $\tau 1$ to greater than $\tau 4$) that may be used by the UE to cover the entire time delay spread in an HSF-SFN scenario.

As shown in FIG. 6A, the uncompensated effective PDP 600 (e.g., the composite of the first PDP trace 602, the second PDP trace 604, the third PDP trace 606, and the fourth PDP trace 608) exhibits nulls between the component traces (e.g., nulls between $\tau 1$ and $\tau 2$, between $\tau 2$ and $\tau 3$, etc.). During the nulls, there may be little or no energy corresponding to the desired information in the downlink channel (or signal) being received at the UE from the respective TRPs. During the nulls, the UE's receiver may receive undesirable interference (e.g., inter-symbol interference (ISI)) rather than the actual desired signal.

As shown in FIG. 6B, the timing precompensated first PDP trace 602 (e.g., associated with a first TRP), previously centered at $\tau 1$, may be delayed in time (i.e., moved along the time axis to the right). The delay may permit the first PDP trace 602 to be centered closer to (as shown) or even centered on (not shown) $\tau 2$. Similarly, the timing precompensated third PDP trace 606 (e.g., associated with a third TRP), previously centered at $\tau 3$, may be advanced in time (i.e., moved along the time axis to the left). The advance may permit the third PDP trace 606 to be centered closer to (as shown) or even centered on (not shown) $\tau 2$. Similarly, the timing precompensated fourth PDP trace 608 (e.g., associated with a fourth TRP), previously centered at $\tau 4$, may be advanced in time (i.e., moved along the time axis to the left). This advance (which in the example is greater than the advance applied to the third PDP trace 606) may permit the fourth PDP trace 608 to be centered closer to (as shown) or even centered on (not shown) $\tau 2$. In the example of FIG. 6B, no beam-specific timing precompensation may be applied to the second PDP trace 604 (e.g., associated with a second TRP). Therefore, the location in time of the second PDP trace 604 remains unchanged on the time axis. The effect of the time shifts on the timing precompensated effective PDP 601 is the narrowing (in time) of the delay spread of the timing precompensated effective PDP 601 of FIG. 6B compared to the uncompensated effective PDP 600 of FIG. 6A.

Of course, the time shifts due to beam-specific timing precompensation in FIG. 6B are exemplary and not limiting. Any combination of time shifts that result in a narrowing of the delay spread (in time) is within the scope of the disclosure. For example, the first PDP trace 602 and the second PDP trace 604 could each be delayed in time to bring their center points closer to or in coincidence with a time between $\tau 2$ and $\tau 3$, while the third PDP trace 606 and the fourth PDP trace 608 could each be advanced in time to bring their center points closer to or in coincidence with the same time between $\tau 2$ and $\tau 3$. Furthermore, precompensation (including precompensating only the first beam, only the second beam, or both the first beam and the second beam) may be applied to the beam pair links of any two or more TRPs. The precompensation applied to the four TRPs (represented by the four PDP traces in FIGS. 6A and 6B) in FIG. 6B are exemplary and not limiting. Still further, the two or more TRPs may be adjacent or non-adjacent to each other.

Based on the time shifts attributable to beam-specific timing precompensation as described herein, the entire delay spread of the effective PDP may be reduced in time. As shown in the example, the entire delay spread in FIG. 6A extends from a point on the time-axis that is earlier than τ1 to a point on the time-axis that is later than τ4. In comparison, the entire delay spread in FIG. 6B extends from a point on the time-axis corresponding to τ1 to a point that lies halfway between τ3 and τ4. The narrowing of the entire delay spread time window, by use of beam-specific timing precompensation, may allow more of the desired signal in the channel to be received across the entire (narrowed compared to FIG. 6B) delay spread, at least because the nulls between the component respective PDP traces, during which interference power could exceed signal power, are narrowed, and may even be eliminated (as shown). Furthermore, the narrowing of the entire delay spread time window may make it easier to process the effective PDP (i.e., the composite of the respective PDP traces).

In some cases, extending a cyclic prefix (CP) duration (as distinct from the practice of beam-specific timing precompensation described herein) may reduce nulls and therefore reduce interference (e.g., inter-symbol interference (ISI)). However, excessive delay spread of a received downlink signal or channel (e.g., such as that illustrated in the example of FIG. 6A) may not be fully compensated by extending the CP duration. In such cases, compensation by extending CP duration would still result in degraded receiver (RX) performance (e.g., due to noise, due to ISI). Furthermore, extending the CP duration undesirably increases transmission overhead. Extending the CP duration and beam-specific timing precompensation as described herein are distinct and different practices.

Additionally, and by way of example only, in Accella type trains, UEs may apply timing advances to their uplink transmissions so that all of the different uplink transmissions that a gNB receives from the UEs may be aligned at the symbol level. In the present practice of TA, a base station uses the downlink to instruct the respective UEs as to the amount of timing advance each respective UE should apply to its respective uplink transmissions. In contrast, in the practice of beam-specific timing precompensation, as described herein, the base station may use the downlink to inform a respective UE as to the amount of timing advance (or delay) that the gNB has already applied, or will apply, to respective downlink beams of respective TRPs.

In summary, compensation techniques to reduce delay spread a PDP of a downlink signal or channel or of an uplink signal or channel in an HST-SFN environment may be a function of the parameters of individual beam pair links and the beam weights used by the single UE and the multiple TRPs. Excessive delay spread may undesirably degrade receiver (RX) performance and may not be compensated for by extending the cyclic prefix (CP) duration. If CP duration is extended to compensate for the delay spread, transmission overhead is undesirably increased. Extending the CP duration in a downlink transmission (and/or the present practice of TA (as exemplified in connection with Accella type trains in an uplink transmission) may be practiced in addition to the beam-specific timing precompensation as described herein.

Figure 7:
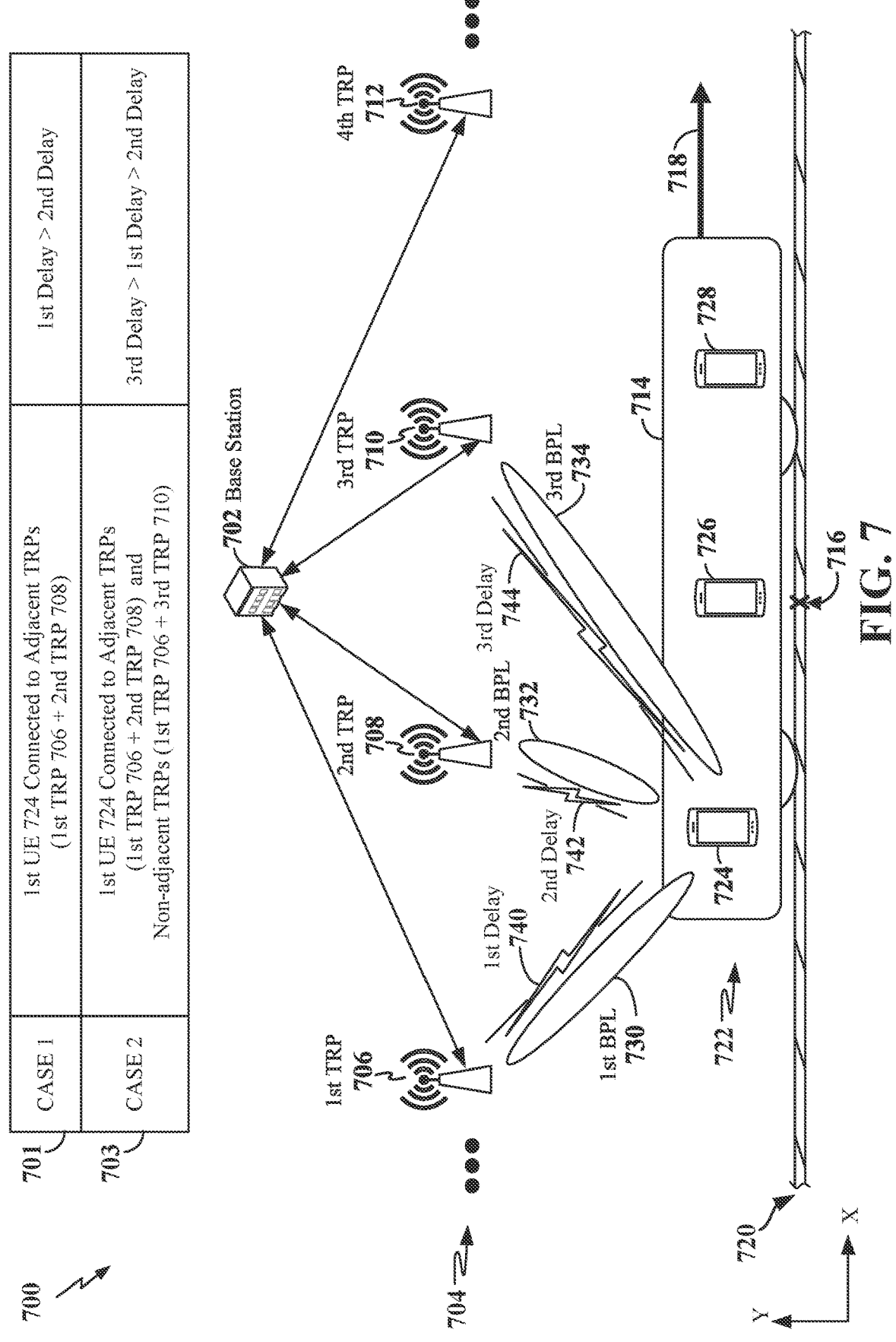
FIG. 7 is a right-side elevation view of a vehicle in an environment illustrating an example of beam-specific timing precompensation in a high-speed train—single frequency network according to some aspects.

FIG. 7 is a right-side elevation view of a vehicle 714 (e.g., a high-speed train car) in an environment illustrating an example of beam-specific timing precompensation in a high-speed train (HST) single frequency network (HST- SFN) 700 according to some aspects. As shown in FIG. 7, the HST-SFN 700 includes a base station 702 including a plurality of transmission and reception points (TRPs) 704 deployed in a remote radio head configuration. In the illustrated example, the plurality of TRPs 704 include a first TRP 706, a second TRP 708, a third TRP 710, and fourth TRP 712; however, any number of TRPs is within the scope of the disclosure. The HST-SFN 700 also includes the vehicle 714 (e.g., the high-speed train car) having a center-line located at a position marked by the letter X 716. As shown in the example of FIG. 7, the vehicle 714 is moving along an X-axis in a direction described by a vector 718 along a path 720 (e.g., a high-speed track). The vehicle 714 may include a plurality of UEs 722.

The plurality of UEs 722 may include a first UE 724, a second UE 726, and a third UE 728. Any number of UEs, from one to many, are within the scope of the disclosure. The plurality of UEs 722 may include a mobile handset, a tablet, a mobile phone, a customer premise equipment (CPE), or the like. The first UE 724 is offset from the centerline X 716 of the vehicle 714; however, because the first UE 724 is located within the vehicle 714, when the vehicle 714 is moving, the velocity, acceleration, and direction of movement of the first UE 724 may be considered to be the same as that of the vehicle 714.

As shown in FIG. 7, the first UE 724 may communicate with the first TRP 706 via a first beam pair link 730. The first beam pair link may include beams at the first TRP for transmission of downlink and reception of uplink (collectively referred to as the transmit beam) and include beams of the first UE 724 for the reception of downlink and transmission of uplink (collectively referred to as the receive beam). The first UE 724 may also communicate with the second TRP 708 via a second beam pair link 732. The first UE 724 may additionally or alternatively also be in communication with the third TRP 710 via a third beam pair link 734. Communication between the first UE 724 and two or more TRPs is within the scope of the disclosure.

It should be understood that each of the plurality of UEs 722 may be in communication with each of the plurality of TRPs 704 via respective beam pair links. While the description herein may use an example of communication between the first UE 724 and both the first TRP 706 and the second TRP 708 (via the first beam pair link 730 and the second beam pair link 732, respectively), or communication between the first UE 724 and the first TRP 706, second TRP 708, and third TRP 710 (via the first beam pair link 730, second beam pair link 732, and third beam pair link 734, respectively), the first UE 724 may be in communication with any two or more of the plurality of TRPs 704 using respective beam pair links while implementing the concepts described herein. Further, each of the plurality of TRPs 704 may communicate with each of the plurality of UEs 722 via respective beam pair links and implement the concepts described herein.

The first UE 724 may transmit one or more uplink transmissions for reception by the base station 702 via the plurality of TRPs 704, including the first TRP 706, the second TRP 708, and/or the third TRP 710 (and/or additional TRPs including but not limited to the fourth TRP 712). The plurality of TRPs 704 may be located at positions adjacent to the path 720 (e.g., mounted adjacent to one another on the walls of a tunnel through which the path 720 transits, or on poles, towers, buildings, or overhead supports staggered along the length of the path 720). As described herein, the first UE 724 may be moving with the plurality of UEs 722 at a same velocity, in the same direction, and along the same path 720 (e.g., defined by train tracks) of the vehicle 714 relative to each of the plurality of TRPs 704 associated with the base station 702. In the example of FIG. 7, the first UE 724 is moving along the X-axis in the direction indicated by the vector 718 (e.g., toward the right). The plurality of UEs 722 may be moving at a constant speed or with acceleration.

The first UE 724 may transmit an uplink signal or channel in (e.g., an uplink transmission) to the first TRP 706 on the first beam pair link 730, to the second TRP 708 on the second beam pair link 732, and/or to the third TRP 710 on the third beam pair link 734. Examples of uplink signals include demodulation reference signal (DM-RS) (for PUSCH and PUCCH), phase-tracking reference signal (PT-RS) (for PUSCH), and sounding reference signal (SRS). Examples of uplink channels include physical uplink shared channel (PUSCH), physical uplink control channel (PUCCH), and physician random-access channel (PRACH). The signal or channel (e.g., uplink transmission) received by the first TRP 706 on the first beam pair link 730 may have a first delay 740 (e.g., a delay between transmission from the first UE 724 and reception via the first TRP 706). The signal or channel received by the second TRP 708 on the second beam pair link 732 may have a second delay 742 (e.g., a delay between transmission from the first UE 724 and reception at the second TRP 708). The signal or channel received by the third TRP 710 on the third beam pair link 734 may have a third delay 744 (e.g., a delay between transmission from the first UE 724 and reception at the third TRP 710).

In a first case 701, where the signal or channel (e.g., the uplink transmission) is received by the first TRP 706 and the second TRP 708, and the first TRP 706 and the second TRP 708 are adjacent to one another, the first delay 740 may be longer than the second delay 742 (because in the example of FIG. 7 the first UE 724 is closer to the second TRP 708 than it is to the first TRP 706). Accordingly, in the example of the first case 701 of FIG. 7, first delay 740>second delay 742. In a second case 703, where the signal or channel is received by the first TRP 706, the second TRP 708, and the third TRP 710, where the first TRP 706 is adjacent to the second TRP 708 and not adjacent to the third TRP 710 (i.e., the second TRP 708 is located between the first TRP 706 and the third TRP 710), the third delay 744 may be longer than the first delay 740, which may longer than the second delay 742 (because in the example of FIG. 7, the first UE 724 is furthest from the third TRP 710, next furthest from the first TRP 706, and closest to the second TRP 708). Accordingly, in the example of the second case 703 of FIG. 7, third delay 744>first delay 740>second delay 742.

In the time span depicted in FIG. 7 (e.g., where the span of time includes at least enough time for the uplink transmission to be received via the first TRP, 706, the second TRP 708, and/or the third TRP 710), a first distance, corresponding to the first delay 740 between the first UE 724 and the first TRP 706 is greater than a second distance, corresponding to the second delay 742 between the first UE and the second TRP 708. A third distance, corresponding to a third delay 744 between the first UE and the third TRP 710 is greater than both the first and second distances. As the vehicle 714 (e.g., the high-speed train) moves down the path 720 (e.g., the train track), the first distance/delay, second distance/delay, and third distance/delay change dynamically. In a next span of time, when the first UE 724 is parallel to the second TRP 708 (not shown), the distances between the first UE 724 and the first TRP 706, and between the first UE 724 and the third TRP 710 may be equal and greater than the distance between the first UE 724 and the second TRP 708. The changing distances/delays are dynamic as long as the vehicle 714 is moving.

By way of example concerning the uplink transmission (e.g., signal or channel), the base station 702 may trigger the first UE 724 to transmit a sounding reference signal (SRS) or another (reference) signal as the uplink transmission from the first UE 724 on two or more of the first beam pair link 730, second beam pair link 732, and/or third beam pair link 734. The base station 702 may determine a timing difference between the reception of the SRS or the other (reference) signal via the first TRP 706 on the first beam pair link 730, the second TRP 708 on the second beam pair link 732, and/or the third TRP 710 on the third beam pair link 734.

In some aspects, the base station 702 may obtain (e.g., estimate, calculate, determine, derive) a first beam-specific timing precompensation for a downlink transmit beam of the first beam pair link 730, a second beam-specific timing precompensation for the downlink transmit beam of the second beam pair link 732, and/or a third beam-specific timing precompensation for the downlink transmit beam of the third beam pair link 734 based on the determined timing difference between the reception of the SRS or the other (reference) signal via the first TRP 706 on the first beam pair link 730, the second TRP 708 on the second beam pair link 732, and/or the third TRP 710 on the third beam pair link 734.

The base station may apply the first beam-specific timing precompensation to the first beam pair link 730, the second beam-specific timing precompensation to the second beam pair link 732, and/or the third beam-specific timing precompensation to the third beam pair link 734 in a downlink transmission of a downlink channel or downlink signal transmitted to the first UE 724 via the first TRP 706, the second TRP 78, and/or the third TRP 710, respectively. The base station 702 may prevent or reduce interference (e.g., ISI) experienced at the first UE 724 due, for example, to the downlink transmission of the channel or signal being received at different times, by the application of the first beam-specific timing precompensation, the second beam-specific timing precompensation, and/or the third beam-specific timing precompensation to the first TRP 706, the second TRP 78, and/or the third TRP 710, respectively.

In the HST-SFN 700 depicted in FIG. 7, a downlink transmission of a given channel or signal from the first TRP 706, second TRP 708, and/or third TRP 710 may utilize the same time-frequency resource. Application of first beam-specific timing precompensation, the second beam-specific timing precompensation, and/or the third beam-specific timing precompensation to the downlink transmission of the given channel or signal on the first beam pair link 730, the second beam pair link 732, and/or the third beam pair link 734, respectively, may reduce the total time spread delay of the power delay profiles of the respective transmissions by shifting one or more of the power delay profiles in time to or toward a predetermined time In some examples, the base station 702 may determine that the first beam-specific timing precompensation is to advance or delay the time of the transmission of the downlink channel or signal on the first beam pair link 730. Similarly, the base station 702 may determine that the second beam-specific timing precompensation is to advance or delay the time of the downlink channel or signal on the second beam pair link 732. Similarly, the base station 702 may determine that the third beam-specific timing precompensation is to advance or delay the time of the transmission of the downlink channel or signal on the third beam pair link 734. In some examples, the base station 702 may determine that the first beam-specific timing precompensation is not to affect the time of the transmission of the downlink channel or signal on the first beam pair link 730. Similarly, the base station 702 may determine that the second beam-specific timing precompensation is not to affect the time of the transmission of the downlink channel or signal on the second beam pair link 732. Similarly, the base station 702 may determine that the third beam-specific timing precompensation is not to affect the time of the transmission of the downlink channel or signal on the third beam pair link 734. The base station 702 may cause any beam-specific timing precompensation not to affect the transmission time of the downlink channel or signal on a given beam pair link by setting the value of the beam-specific timing precompensation to zero for the given beam pair link. In one example, for purposes of discussion and not limitation, the base station 702 may determine that the first beam-specific timing precompensation is not to affect a time of transmission from the first TRP 706 of the downlink channel or signal on the first beam pair link 730 (i.e., set the first beam-specific timing precompensation to zero) while setting the second beam-specific timing precompensation and/or the third beam-specific timing precompensation to shift the second PDP of the second TRP 708 and/or the third PDP of the third TRP 710 toward the first PDP of the first TRP 706.

In some aspects, obtaining the first beam-specific timing precompensation, the second beam-specific timing precompensation, and/or third beam-specific timing precompensation may include determining the first beam-specific timing precompensation, the second beam-specific timing precompensation, and/or the third beam-specific timing precompensation for at least one of one or more signals, one or more UE-specific channels, or one or more common channels that are common to each UE of a plurality of UEs (e.g., the plurality of UEs 722). For example, as described herein, the first beam-specific timing precompensation, the second beam-specific timing precompensation, and/or the third beam-specific timing precompensation may be used to precompensate one or more signals (e.g., DM-RSs, tracking reference signals (TRSs), etc.), one or more UE-specific channels (e.g., a PDSCH or UE-specific DCI carried within a PDCCH that is specific to a particular UE on the vehicle 714), or one or more common channels (e.g., common DCI carried within a PDCCH) that are common to each of the plurality of UEs 722 on the vehicle 714.

The base station 702 may transmit an indication of at least one of the first beam-specific timing precompensation, the second beam-specific timing precompensation, or the third beam-specific timing precompensation to the first UE 724 (i.e., the base station transmits to the first UE 724 the beam-specific timing precompensations that are and/or will be used by the base station 702 for downlink transmissions to the first UE 724). For example, the indication of the at least one of the first beam-specific timing precompensation, the second beam-specific timing precompensation, or the third beam-specific timing precompensation may be transmitted to at least the first UE 724 of the plurality of UEs 722 using at least one of downlink control information (DCI), transmission configuration indication (TCI), medium access control (MAC) control element (MAC-CE), or RRC signaling. In some aspects, the indication of the at least one of the first beam-specific timing precompensation, the second beam-specific timing precompensation, or the third beam-specific timing precompensation may vary over time based on, for example, at least one of a velocity of the first UE 724 (and/or the plurality of UEs 722) moving along the path 720, an acceleration of the first UE 724 (and/or the plurality of UEs 722) moving along the path 720, a position of at least one UE (e.g., the first UE 724) of the plurality of UEs 722 (where the position may be given by a geographic location such as latitude and longitude, a reference to a predefined location on the path 720, a position with reference to a time of departure or arrival of the vehicle 714 at a given station or location along the path, etc.), or a direction of a movement (travel) of the first UE 724 (and/or the plurality of UEs 722) along the path 720.

For example, when the velocity of the vehicle 714 changes, the rate of change of a distance between each of the TRPs (including the first TRP 706, second TRP 708, and third TRP 710) and the first UE 724 varies. To accommodate this rate of distance change, the base station 702 may modify or change one or more beam-specific timing precompensations for beam pair links of each TRP of the plurality of TRPs 704 positioned along the path 720, including, for example, the first beam-specific timing precompensation applied to the downlink transmit beam of the first beam pair link 730, the second beam-specific timing precompensation applied to the downlink transmit beam of the second beam pair link 732, and/or the third beam-specific timing precompensation applied to the downlink transmit beam of the third beam pair link 734, associated with the first TRP 706, the second TRP 708, and/or the third TRP 710, respectively.

As another example, when a position of the vehicle 714 changes along the path 720, the position of the first UE 724 may also change along the path 720, causing a change in distance between each of the plurality of TRPs 704 (including the first TRP 706, second TRP 708, and third TRP 710) and the plurality of UEs 722 (including the first UE 724, second UE 726, and third UE 728). The change in distance may cause the base station 702 to modify or change one or more beam-specific timing precompensations for beams of each TRP of the plurality of TRPs 704 positioned along the path 720, including, for example, the first beam-specific timing precompensation applied to the downlink transmit beam of the first beam pair link 730, the second beam-specific timing precompensation applied to the downlink transmit beam of the second beam pair link 732, and/or the third beam-specific timing precompensation applied to the downlink transmit beam of the third beam pair link 734, associated with the first TRP 706, the second TRP 708, and/or the third TRP 710, respectively.

As yet another example, when a direction of movement of the vehicle 714 changes along the path 720, the direction of movement of the first UE 724 may change relative to each of the plurality of TRPs 704 (including the first TRP 706, second TRP 708, and third TRP 710) and the first UE 724. The change in the direction of movement may cause the base station 702 to modify or change one or more beam-specific timing precompensations for beams of each of the plurality of TRPs 704 positioned along the path 720, including, for example, the first beam-specific timing precompensation applied to the downlink transmit beam of the first beam pair link 730, the second beam-specific timing precompensation applied to the downlink transmit beam of the second beam pair link 732, and/or the third beam-specific timing precompensation applied to the downlink transmit beam of the third beam pair link 734, associated with the first TRP 706, the second TRP 708, and/or the third TRP 710, respectively.

Subsequently, the base station 702 may transmit a physical downlink shared channel (PDSCH) transmission (or other downlink channel or signal) over one resource (e.g., time-frequency resource) via the first beam pair link 730 of the first TRP 706 according to the first beam-specific timing precompensation, the second beam pair link 732 of the second TRP 708 according to the second beam-specific timing precompensation, and/or the third TRP 710 according to the third beam-specific timing precompensation.

In some examples, each data layer of the PDSCH may be associated with a plurality of transition configuration indication (TCI) states. For example, each data layer of the PDSCH may be associated with a first TCI state indicating the downlink transmit beam of the first beam pair link 730 of the first TRP 706, and a second TCI state indicating the downlink transmit beam of the second beam pair link 732 of the second TRP 708. In some examples, each data layer of the PDSCH may be associated with a single composite TCI state representative of a plurality of TCI states. For example, each data layer of the PDSCH may be associated with a single composite TCI state that is representative of the first TCI state and the second TCI state.

Figure 8:
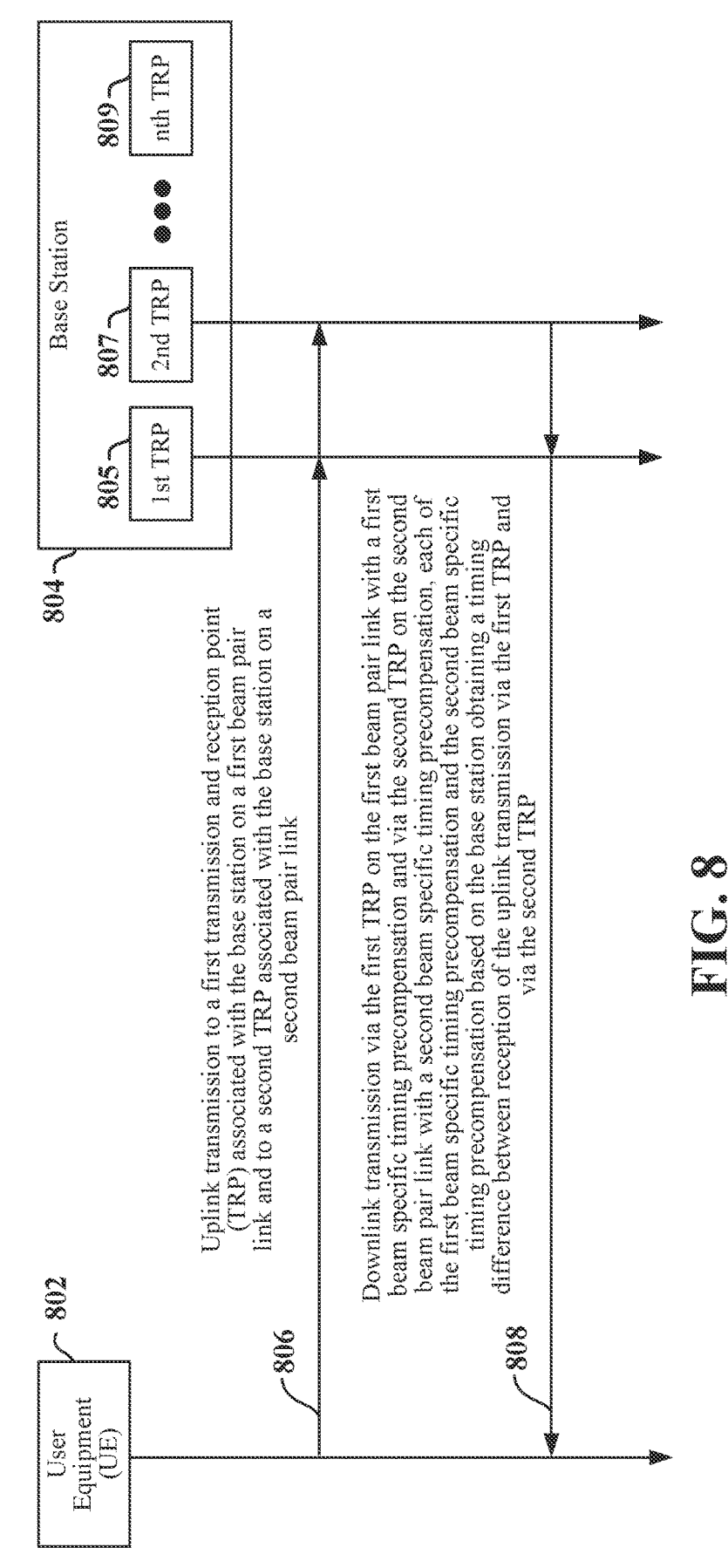
FIG. 8 is a signaling diagram illustrating exemplary signaling for beam-specific timing precompensation according to some aspects.

FIG. 8 is a signaling diagram illustrating exemplary signaling 800 for beam-specific timing precompensation according to some aspects. In some examples, the exemplary signaling 800 may be utilized in a single frequency network (SFN). In some examples, the exemplary signaling 800 may be utilized in a high-speed train (HST) single frequency network (HST-SFN). In the example shown in FIG. 8, a user equipment (UE) 802 (e.g., first UE 724 as shown and described above in connection with FIG. 7) may be in wireless communication with a base station 804 (e.g., base station 702 as shown and described above in connection with FIG. 7). The base station 804 may have a plurality of TRPs utilized in a remote radio head configuration. In the example of FIG. 8, a first TRP 805, and a second TRP 807 through an nth TRP 809 are depicted, where n is a positive integer (e.g., first TRP 706, second TRP 708, and/or third TRP 710 as shown and described above in connection with FIG. 7). The UE 802 may be in wireless communication with the base station 804 via two or more of the plurality of TRPs, including the first TRP 805 on a first beam pair link and the second TRP 807 on a second beam pair link (e.g., first beam pair link 730 and second beam pair link 732 as shown and described above in connection with FIG. 7). The UE 802, the base station 804, the first TRP 805 and the second TRP 807 through nth TRP 809 may correspond to like-named entities as shown and described above in connection with FIGS. 1, 2, 4, 5, and/or 7.

At 806, the UE 802 may transmit an uplink transmission to the first TRP 805 associated with the base station 804 on a first beam pair link (not shown), and to a second TRP 807 associated with the base station 804 on a second beam pair link (not shown). Correspondingly, at 806, the first TRP 805 associated with the base station 804 and the second TRP 807 associated with the base station 804 may each receive the uplink transmission. Because the distance between the UE 802 and the first TRP 805 may not be equal to the distance between the UE 802 and the second TRP 807, the uplink transmission may be received via the first TRP 805 and the second TRP 807 at different times. The base station 804 may determine the timing difference between the reception of the uplink transmission via the first TRP 805 and the second TRP 807.

At 808, the UE 802 may receive a downlink transmission via the first TRP 805 on the first beam pair link (not shown) with a first beam-specific timing precompensation, and via the second TRP 807 on the second beam pair link (not shown) with a second beam-specific timing precompensation, each of the first beam-specific timing precompensation and the second beam-specific timing precompensation may be based on the base station's 804 determination of the timing difference between the reception of the uplink transmission via the first TRP 805 and the second TRP 807.

Figure 9:
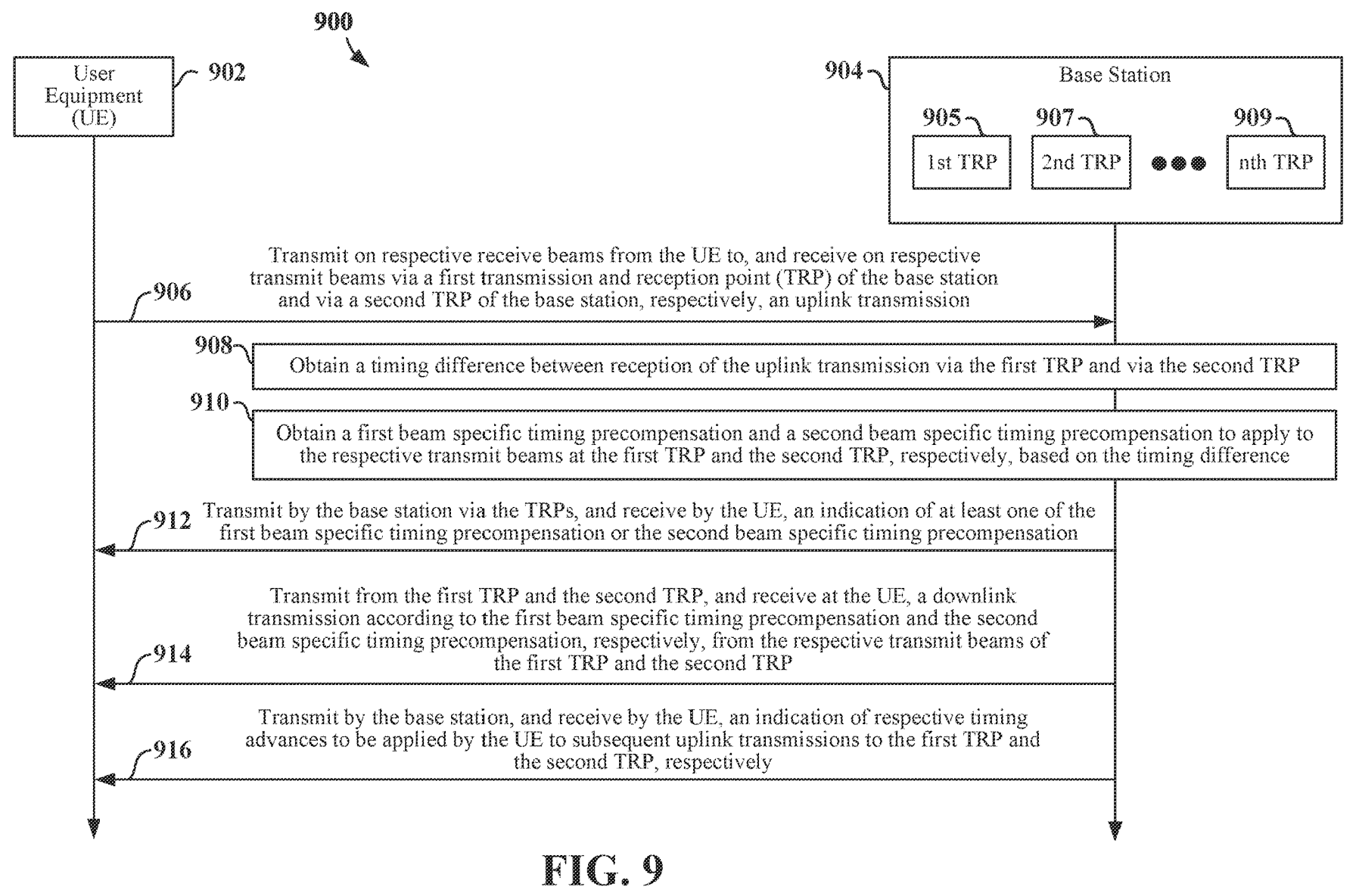

FIG. 9 is a signaling diagram illustrating exemplary signaling 900 for beam-specific timing precompensation according to some aspects. In some examples, the exemplary signaling 900 may be utilized in a single frequency network (SFN). In some examples, the exemplary signaling 900 may be utilized in a high-speed train (HST) single frequency network (HST-SFN). In the example shown in FIG. 9, a user equipment (UE) 902 (e.g., first UE 724 as shown and described above in connection with FIG. 7) may be in wireless communication with a base station 904 (e.g., base station 702 as shown and described above in connection with FIG. 7). The base station 904 may have a plurality of TRPs utilized in a remote radio head configuration. In the example of FIG. 9, a first TRP 905, and a second TRP 907 through an nth TRP 909 are depicted, where n is a positive integer (e.g., first TRP 706, second TRP 708, and/or third TRP 710 as shown and described above in connection with FIG. 7). The UE 902 may be in wireless communication with the base station 904 via two or more of the plurality of TRPs, including the first TRP 905 on a first beam pair link and the second TRP 907 on a second beam pair link (e.g., first beam pair link 730 and second beam pair link 732 as shown and described above in connection with FIG. 7). The UE 902, the base station 904, the first TRP 905 and the second TRP 907 through nth TRP 909 may correspond to like-named entities as shown and described above in connection with FIGS. 1, 2, 4, 5, and/or 7.

At 906, an uplink transmission (e.g., an uplink channel or signal) may be transmitted on respective receive beams of respective beam pair links from the UE 902 to the base station 904 via respective TRPs (e.g., via the first TRP 905 and the second TRP 907). Correspondingly, the uplink transmission may be received at the base station 904 via respective transmit beams at the respective TRPs (e.g., a first transmit beam of a first beam pair link at the first TRP 905 associated with the base station 904 and a second transmit beam of a second beam pair link at the second TRP 907 associated with the base station 904).

At 908, the base station 904 may determine a time difference between the reception of the uplink transmission via the first TRP 905 and the second TRP 907. At 910, the base station 904 may obtain (e.g., estimate, calculate, determine, derive) a first beam-specific timing precompensation and a second beam-specific timing precompensation to apply to the respective transmit beams at the first TRP 905 and the second TRP 907, respectively, based on the time difference.

At 912, the base station may transmit, and the UE 902 may receive, an indication of at least one of the first beam-specific timing precompensation or the second beam-specific timing precompensation, which were or will be applied to a downlink transmission from the base station 904 via the first TRP 905 and the second TRP 907, respectively. At 914, the first TRP 905 and the second TRP 907 may transmit, and the UE 902 may receive, a downlink transmission according to the first beam-specific timing precompensation and the second beam-specific timing precompensation, respectively, from the respective transmit beams of the first TRP 905 and the second TRP 907. At 916, the base station 904 may transmit, and the UE 902 may receive, an indication of respective timing advances to be applied by the UE 902 to subsequent uplink transmissions to the first TRP 905 and the second TRP 907, respectively.

Figure 10:
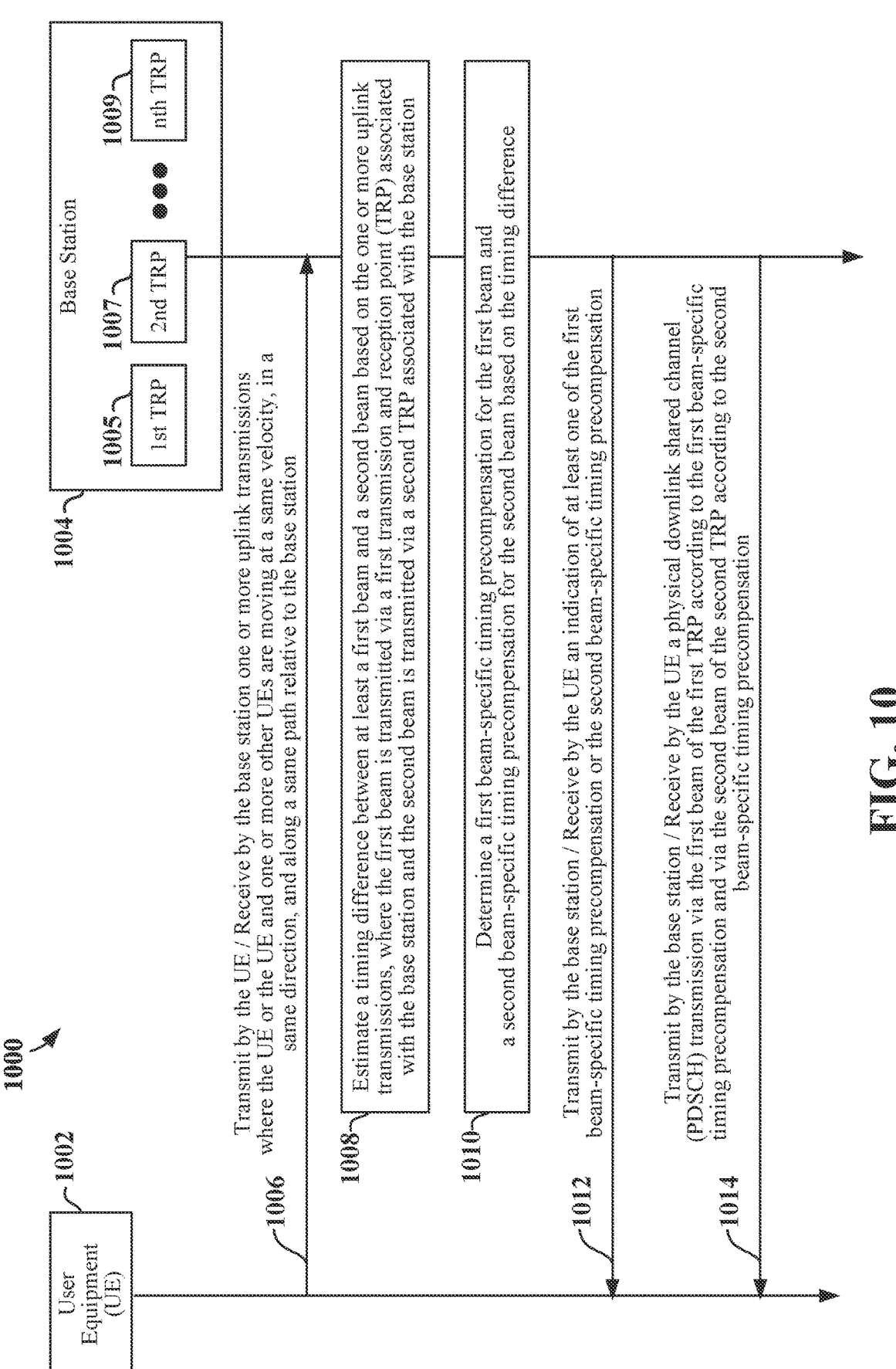
FIG. 10 is a signaling diagram illustrating exemplary signaling for beam-specific timing precompensation according to some aspects.

FIG. 10 is a signaling diagram illustrating exemplary signaling 1000 for beam-specific timing precompensation according to some aspects. In some examples, the exemplary signaling 1000 may be utilized in a single frequency network (SFN). In some examples, the exemplary signaling 1000 may be utilized in a high-speed train (HST) single frequency network (HST-SFN). In the example shown in FIG. 10, a user equipment (UE) 1002 is in wireless communication with a base station 1004 over one or more wireless communication links. In some aspects, the UE 1002 may be in wireless communication with the base station 1004 via a plurality of transmission and reception points (TRPs), including a first TRP 1005 and a second TRP 1007 associated with the base station 1004. Each of the UE 1002, the base station 1004, the first TRP 1005 and the second TRP 1007 through nth TRP 1009 may correspond to like-named entities as shown and described above in connection with FIGS. 1, 2, 4, 5, and/or 7.

At 1006, the UE 1002 may transmit one or more uplink transmissions for reception by the base station 1004. In some aspects, the UE 1002 may be moving with one or more other UEs at a same velocity and along a same path relative to the base station 1004. For example, as the UE 1002 is traveling in a direction along a path (e.g., along a train track), the UE 1002 may transmit one or more uplink transmissions to a plurality of TRPs, including a first TRP 1005 and a second TRP 1007 located at positions adjacent the path, as shown in FIG. 7. The UE 1002 may transmit an uplink transmission using a first uplink beam to the first TRP 1005 associated with the base station 1004 and an uplink transmission using a second uplink beam to the second TRP 1007 associated with the base station 1004. In some aspects, the one or more uplink transmissions may include a sounding reference signal (SRS).

At 1008, the base station 1004 may obtain (e.g., estimate, calculate, determine, derive) a timing difference (e.g., a delay, a timing delay) between at least a first beam and a second beam based on the one or more uplink transmissions, where the first beam may be transmitted by the first TRP 1005 associated with the base station 1004 and the second beam may be transmitted by the second TRP 1007 associated with the base station 1004. For example, the base station 1004 may obtain a timing difference between the reception of the first uplink beam by the first TRP 1005 and the reception of the second uplink beam by the second TRP 1007. The base station 1004 may estimate a timing difference between the first beam for transmission by the first TRP 1005 to the UE 1002 and a second beam for transmission by the second TRP 1007 to the UE 1002 based on the timing difference between the reception of the one or more uplink transmissions from the UE 1002 by the first TRP 1005 and the reception of the one or more uplink transmissions by the second TRP 1007.

At 1010, the base station 1004 may obtain a first beam-specific timing precompensation (e.g., first beam-specific timing precompensation) for the first beam and a second beam-specific timing precompensation (e.g., a second beam-specific timing precompensation) for the second beam based on the timing difference. In some aspects, to prevent or reduce inter-symbol interference (ISI) between a transmission of a downlink channel or signal utilizing the first beam from the first TRP 1005 and the second beam from the second TRP 1007, the base station 1004 may obtain the first beam-specific timing precompensation for the first beam and the second beam-specific timing precompensation for the second beam based on the obtained timing difference between the first beam and the second beam. In some examples, the base station 1004 may determine that the first beam-specific timing precompensation is to either advance or delay in time a transmission of the downlink channel or signal (e.g., a downlink transmission) on the first beam. Similarly, the base station 1004 may determine that the second beam-specific timing precompensation is to either advance or delay in time a transmission of the downlink channel or signal on the second beam. Alternatively, the base station 1004 may determine that the first beam-specific timing precompensation is not to affect a transmission time of the downlink channel or signal on the first beam by the first TRP 1005. Similarly, the base station 1004 may determine that the second beam-specific timing precompensation is not to affect a transmission time of the downlink channel or signal on the second beam by the second TRP 1007.

In some aspects, obtaining the first beam-specific timing precompensation and the second beam-specific timing precompensation may include determining the first beam-specific timing precompensation and the second beam-specific timing precompensation for at least one of one or more signals, one or more UE-specific channels, or one or more common channels that are common to each UE of the plurality of UEs. For example, as described herein, the HST may include (e.g., carry, transport within) a plurality of UEs including the UE 1002, and the first beam-specific timing precompensation and the second beam-specific timing precompensation may be for one or more signals (e.g., DM-RSs, TRSs, etc.), one or more UE-specific channels (e.g., PDCCH or PDSCH), or one or more common channels (e.g., common control information carried in a PDCCH) that are common to each of the plurality of UEs on the HST.

At 1012, the base station 1004 may transmit an indication of at least one of the first beam-specific timing precompensation or the second beam-specific timing precompensation for reception by the UE 1002. For example, the indication of at least one of the first beam-specific timing precompensation or the second beam-specific timing precompensation may be transmitted to the at least one UE of the plurality of UEs using at least one of downlink control information (DCI) or a medium access control (MAC) control element (MAC-CE). In some aspects, the indication of at least one of the first beam-specific timing precompensation or the second beam-specific timing precompensation may vary over time based on at least one of the velocity of the one or more UEs moving along the path, a position of at least one UE of the one or more UEs, or a direction of a movement of the one or more UEs along the path.

For example, when the velocity of the HST changes, the rate at which a distance changes between each of the TRPs, including the first TRP 1005 and the second TRP 1007, and the UE 1002 varies. To accommodate this rate of distance change, the base station 1004 may modify or change one or more beam-specific timing precompensations for beams of each TRP of the plurality of TRPs positioned along the path, including the first beam-specific timing precompensation of the first beam of the first TRP 1005 and the second beam-specific timing precompensation of the second beam of the second TRP 1007. As another example, when a position of the HST changes along the path, the position of the UE 1002 may also change along the path, causing a change in distance between each of the TRPs, including the first TRP 1005 and the second TRP 1007, and the UE 1002. The change in distance may cause the base station 1004 to modify or change one or more beam-specific timing precompensations for beams of each TRP of the one or more TRPs positioned along the path, including the first beam-specific timing precompensation of the first beam of the first TRP 1005 and the second beam-specific timing precompensation of the second beam of the second TRP 1007. As yet another example, when a direction of movement of the HST changes along the path, the direction of movement of the UE 1002 may change relative to each TRP, including the first TRP 1005 and the second TRP 1007, and the UE 1002. The change in the direction of movement may cause the base station 1004 to modify or change one or more beam-specific timing precompensations for beams of each TRP of the plurality of TRPs positioned along the path, including the first beam-specific timing precompensation of the first beam of the first TRP 1005 and the second beam-specific timing precompensation of the second beam of the second TRP 1007.

At 1014, the base station 1004 may transmit a same physical downlink shared channel (PDSCH) transmission (or other downlink channel or signal) via both the first beam of the first TRP 1005 according to the first beam-specific timing precompensation and the second beam of the second TRP 1007 according to the second beam-specific timing precompensation. The TRPs, including the first TRP 1005 and the second TRP 1007, may each transmit the PDSCH transmission over a same resource (e.g., time-frequency resource) using their respective beams (e.g., the first beam for the first TRP 1005, the second beam for the second TRP 1007) adjusted according to their respective beam-specific timing precompensations. In some examples, each data layer of the PDSCH may be associated with a plurality of transition configuration indication (TCI) states. For example, each data layer of the PDSCH may be associated with a first TCI state indicating the first beam on the first TRP 1005, and a second TCI state indicating the second beam on the second TRP 1007. In some examples, each data layer of the PDSCH may be associated with a single composite TCI state representative of a plurality of TCI states. For example, each data layer of the PDSCH may be associated with a TCI state that is representative of the first TCI state and the second TCI state.

Figure 11:
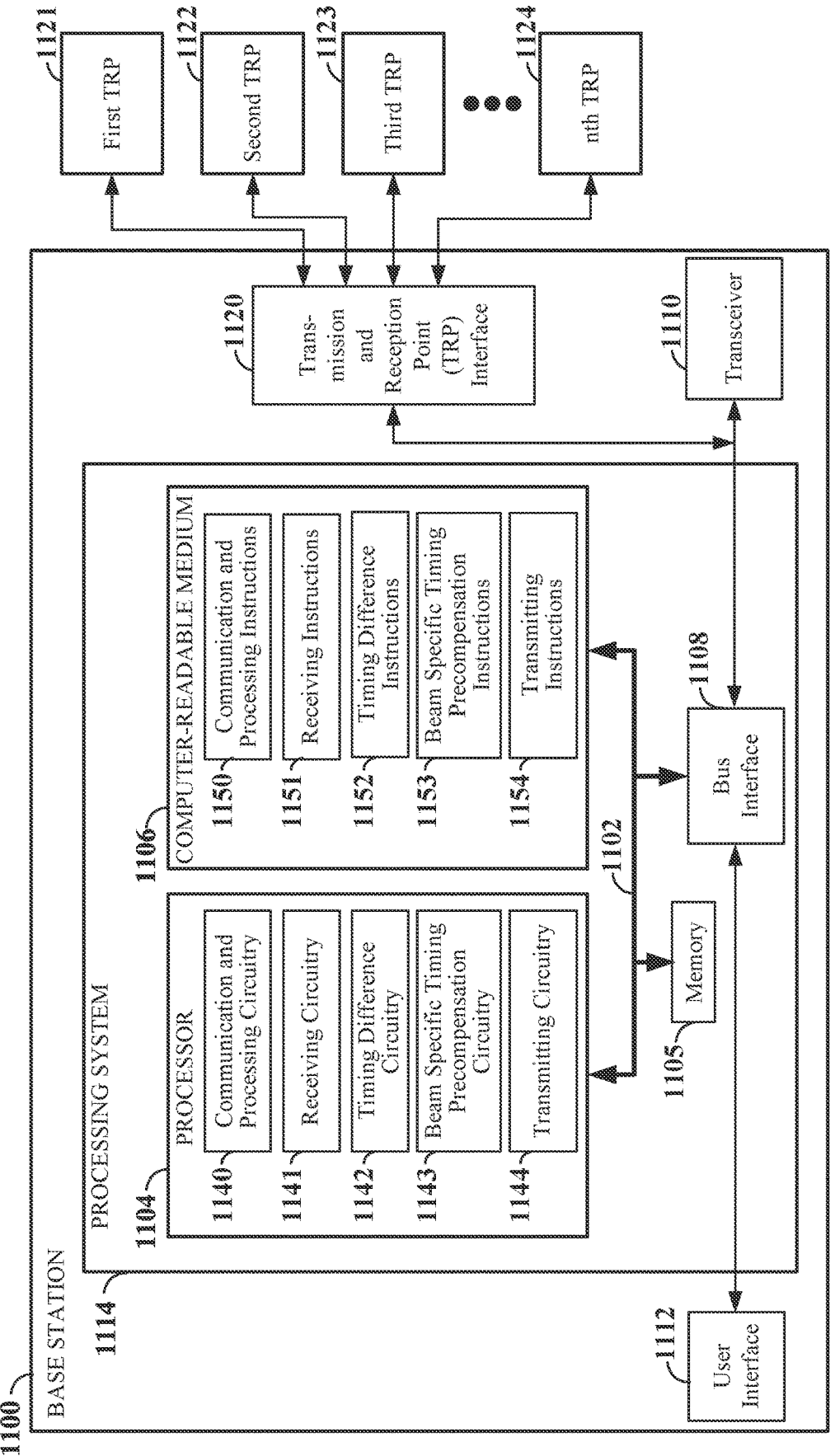
FIG. 11 is a block diagram illustrating an example of a hardware implementation of a base station employing a processing system according to some aspects.

FIG. 11 is a block diagram illustrating an example of a hardware implementation of a base station 1100 employing a processing system 1114 according to some aspects. The base station 1100 may be any base station (e.g., scheduling entity, gNB, eNB) illustrated in any one or more of FIGS. 1, 2, 4, 5, and 7-10.

In accordance with various aspects of the disclosure, an element, or any portion of an element, or any combination of elements may be implemented with a processing system 1114 that includes one or more processors, such as processor 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1100 may be configured to perform any one or more of the functions described herein. That is, the processor 1104, as utilized in the base station 1100, may be used to implement any one or more of the methods or processes described and illustrated, for example, in FIGS. 8, 9, and/or 10.

The processor 1104 may in some instances be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits, including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, are not described any further.

A bus interface 1108 provides an interface between the bus 1102 and a transceiver 1110. The transceiver 1110 may be, for example, a wireless transceiver. The transceiver 1110 provides a means for communicating with various other apparatus over a transmission medium (e.g., air interface). The transceiver 1110 may further be coupled to one or more antennas/antenna arrays (not shown). The bus interface 1108 further provides an interface between the bus 1102 and a user interface 1112 (e.g., keypad, display, touch screen, speaker, microphone, control features, etc.). Of course, such a user interface 1112 may be omitted in some examples. In addition, the bus interface 1108 further provides an interface between the bus 1102 and a power source (not shown). The bus interface 1108 may also provide an interface between the bus 1102 and a transmit receive point (TRP) interface 1120. The TRP interface 1120 may provide an interface between the base station 1100 and a plurality of TRPs (including a first TRP 1121, a second TRP 1122, and/or a third TRP 1123 through nth TRP 1124, where n is a positive integer). The plurality of TRPs may be configured as remote radio heads of the base station 1100.

One or more processors, such as processor 1104, may be responsible for managing the bus 1102 and general processing, including the execution of software stored on the computer-readable medium 1106. Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise. The software may reside on the computer-readable medium 1106. The software, when executed by the processor 1104, causes the processing system 1114 to perform the various processes and functions described herein for any particular apparatus.

The computer-readable medium 1106 may be a non-transitory computer-readable medium and may be referred to as a computer-readable storage medium or a non-transitory computer-readable medium. The non-transitory computer-readable medium may store computer-executable code (e.g., processor-executable code). The computer executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities, including the processing system 1114. The computer-readable medium 1106 may be embodied in a computer program product or article of manufacture. By way of example, a computer program product or article of manufacture may include a computer-readable medium in packaging materials. In some examples, the computer-readable medium 1106 may be part of the memory 1105. Those skilled in the art will recognize how best to implement the described functionality presented throughout this disclosure depending on the particular application and the overall design constraints imposed on the overall system. The computer-readable medium 1106 and/or the memory 1105 may also be used for storing data that may be manipulated by the processor 1104 when executing software.

In some aspects of the disclosure, the processor 1104 may include communication and processing circuitry 1140 configured for various functions, including for example, communicating with a network core (e.g., a 5G core network), one or more scheduling entities, scheduled entities, one or more TRPs (such as the first TRP 1121, the second TRP 1122, and/or the third TRP 1123 through nth TRP 1124), and/or any other entity, such as, for example, local infrastructure or an entity communicating with the base station 1100 via the Internet, such as a network provider. According to some aspects, the various functions of the communication and processing circuitry 1140 may be utilized to implement beam-specific timing precompensation as described herein.

In some examples, the communication and processing circuitry 1140 may include one or more hardware components that provide the physical structure that performs processes related to wireless communication (e.g., signal reception and/or signal transmission) and signal processing (e.g., processing a received signal and/or processing a signal for transmission), as well as performs processes related to beam-specific timing precompensation processes as described herein. In addition, the communication and processing circuitry 1140 may be configured to receive and process downlink traffic and downlink control (e.g., similar to downlink traffic 112 and downlink control 114 of FIG. 1) and process and transmit uplink traffic and uplink control (e.g., similar to uplink traffic 116 and uplink control 118 of FIG. 1). The communication and processing circuitry 1140 may further be configured to execute communication and processing software 1150 stored on the computer-readable medium 1106 to implement one or more functions described herein.

In some aspects, the processor 1104 may include circuitry configured for various other functions. For example, the processor 1104 may include receiving circuitry 1141 configured to receive an uplink transmission via a first transmission and reception point (TRP) associated with the base station 1100 (e.g., first TRP 1121) on a first beam pair link and a second TRP (e.g., second TRP 1122) associated with the base station 1100 on a second beam pair link. In another example, the receiving circuitry 1141 may be configured to receive on respective transmit beams (e.g., the transmit beams of respective beam pair links) via a first TRP (e.g., first TRP 1121) associated with the base station 1100 and a second TRP (e.g., second TRP 1122) associated with the base station 1100, respectively, an uplink transmission. In another example, the receiving circuitry 1141 may be configured to receive one or more uplink transmissions from one or more user equipment (UEs), where each of the one or more UEs are moving at a same velocity and along a same path relative to the base station. The receiving circuitry 1141 may be configured to execute receiving instructions 1151 stored in the computer-readable medium 1106 to implement any of the one or more of the functions described herein.

The processor 1104 may also include timing difference circuitry 1142. In one example, the timing difference circuitry 1142 may be configured to obtain (e.g., estimate, calculate, determine, derive) a timing difference between the reception of an uplink transmission via the first TRP (e.g., the first TRP 1121) and the second TRP (e.g., the second TRP 1122). In another example, the timing difference circuitry 1142 may be configured to obtain a timing difference between at least a first beam and a second beam based on the one or more uplink transmissions, where the first beam may be transmitted by a first transmission and reception point (TRP) (e.g., first TRP 1121) of a plurality of TRPs associated with the base station 1100 and the second beam may be transmitted by a second TRP (e.g., second TRP 1122) of the plurality of TRPs associated with the base station 1100. The timing difference circuitry 1142 may be configured to execute timing difference instructions 1152 stored in the computer-readable medium 1106 to implement any of the one or more of the functions described herein.

The processor 1104 may further include beam-specific timing precompensation circuitry 1143. In one example, the beam-specific timing precompensation circuitry 1143 may be configured to obtain (e.g., estimate, calculate, determine, derive) the first beam-specific timing precompensation and the second beam-specific timing precompensation based on a timing difference between the reception of the uplink transmission via the first TRP (e.g., first TRP 1121) and the second TRP (e.g., second TRP 1122). The timing difference may be obtained by the base station 1100 using, for example, the timing difference circuitry 1142 described above. In another example, the beam-specific timing precompensation circuitry 1143 may be configured to obtain the first beam-specific timing precompensation and the second beam-specific timing precompensation to apply to respective transmit beams at the first TRP (e.g., first TRP 1121) and the second TRP (e.g., second TRP 1122), respectively. Again, the first beam-specific timing precompensation and the second beam-specific timing precompensation may be based on the timing difference obtained by the timing difference circuitry 1142. In another example, the beam-specific timing precompensation circuitry 1143 may be configured to determine a first beam-specific timing precompensation (e.g., a first delay precompensation) for a first beam (e.g., a first transmit beam of a first beam pair link) and a second beam-specific timing precompensation (e.g., a second delay precompensation) for a second beam (e.g., a second transmit beam of a second beam pair link) based on the timing difference. The beam-specific timing precompensation circuitry 1143 may be configured to execute beam-specific timing precompensation instructions 1153 stored in the computer-readable medium 1106 to implement any of the one or more of the functions described herein.

The processor 1104 may also include transmitting circuitry 1144. The transmitting circuitry 1144, in combination with the TRP interface 1120 and the plurality of TRPs (including, for example, the first TRP 1121 and the second TRP 1122), may be configured to transmit a downlink transmission via the first TRP (e.g., first TRP 1121) on the first beam pair link with the first beam-specific timing precompensation and via the second TRP (e.g., second TRP 1122) on the second beam pair link with the second beam-specific timing precompensation. In some examples, the first beam-specific timing precompensation and the second beam-specific timing precompensation may be obtained from the beam-specific timing precompensation circuitry 1143. In another example, the transmitting circuitry 1144 may be configured to transmit an indication of at least one of the first beam-specific timing precompensation or the second beam-specific timing precompensation to the UE. In another example, the transmitting circuitry 1144 may be configured to transmit via the first TRP and the second TRP the downlink transmission according to the first beam-specific timing precompensation and the second beam-specific timing precompensation, respectively, from the respective transmit beams of the first TRP and the second TRP. In another example, the transmitting circuitry 1144 may be configured to transmit, by the base station, an indication of respective timing advances to be applied by the UE to subsequent uplink transmissions to the first TRP and the second TRP, respectively. In still another example, the transmitting circuitry 1144 may be configured to transmit an indication of at least one of the first beam-specific timing precompensation (e.g., first delay precompensation) or the second beam-specific timing precompensation (e.g., second delay precompensation) to at least one UE of one or more UEs. The transmitting circuitry 1144 may also be configured to transmit a physical downlink shared channel (PDSCH) transmission through the first beam of the first TRP according to the first beam-specific timing precompensation and the second beam of the second TRP according to the second beam-specific timing precompensation. The transmitting circuitry 1144 may be configured to execute transmitting instructions 1154 stored in the computer-readable medium 1106 to implement any of the one or more of the functions described herein.

FIG. 12 is a flow chart of a method of wireless communication 1200 utilizing beam-specific timing precompensation according to some aspects. In some examples, the method of wireless communication 1200 may be utilized in a single frequency network (SFN). In some examples, the method of wireless communication 1200 may be utilized in a high-speed train (HST) single frequency network (HST-SFN). As described below, some or all illustrated features may be omitted in a particular implementation within the scope of the present disclosure, and some illustrated features may not be required for implementation of all aspects. In some examples, the method of wireless communication 1200 may be performed by the base station 1100, as described herein and illustrated in FIG. 11, by a processor or processing system, or by any suitable means for carrying out the described functions.

At block 1202, the base station may receive, via a first transmission and reception point (TRP) associated with the base station, an uplink transmission (e.g., a channel, a signal) on a first transmit beam of a first beam pair link (e.g., a first beam of the first beam pair link at the TRP that is utilized for downlink or uplink communication and is at this moment configured to receive an uplink). At block 1204, the base station may receive, via a second TRP associated with the base station, the uplink transmission on a second transmit beam of a second beam pair link (e.g., a second beam of the second beam pair link at the TRP that is utilized for downlink or uplink communication and is at this moment configured to receive an uplink). The uplink transmission may be received (via the first TRP and the second TRP) from a UE. For example, the receiving circuitry 1141 together with the TRP interface 1120, the first TRP 1121 and the second TRP 1122, shown and described above in connection with FIG. 11, may provide a means for receiving, via a first transmission and reception point (TRP) associated with the base station, an uplink transmission on a first transmit beam of a first beam pair link, and receiving, via a second TRP associated with the base station, the uplink transmission on a second transmit beam of a second beam pair link.

At block 1206, the base station may transmit, via the first TRP, a downlink transmission (e.g., a channel, a signal) on the first transmit beam (of the first beam pair link) (e.g., the first beam of the first beam pair link at the TRP that is utilized for downlink or uplink communication and is at this moment configured to transmit a downlink) with a first beam-specific timing precompensation. At block 1208, the base station may transmit, via the second TRP<the downlink transmission on the second transmit beam (of the second beam pair link) (e.g., the second beam of the second beam pair link at the TRP that is utilized for downlink or uplink communication and is at this moment configured to transmit a downlink) with a second beam-specific timing precompensation, where the first beam-specific timing precompensation and the second beam-specific timing precompensation may be based on a timing difference between the reception of the uplink transmission via the first TRP and the reception of the uplink transmission via the second TRP.

The base station may obtain (e.g., estimate, calculate, determine, derive) the timing difference and may also obtain the first beam-specific timing precompensation and the second beam-specific timing precompensation based on the timing difference. For example, the transmitting circuitry 1144 together with the TRP interface 1120, the first TRP 1121, and the second TRP 1122, as shown and described above in connection with FIG. 11, may provide a means for transmitting, via the first TRP, a downlink transmission on the first transmit beam with a first beam-specific timing precompensation, and may also provide a means for transmitting, via the second TRP, the downlink transmission on the second transmit beam with a second beam-specific timing precompensation. Additionally, the timing difference circuitry 1142 may provide a means for obtaining a timing difference between the reception of the uplink transmission via the first TRP and the second TRP. Furthermore, the beam-specific timing precompensation circuitry 1143 may provide a means for obtaining the first beam-specific timing precompensation and the second beam-specific timing precompensation based on the timing difference between the reception of the uplink transmission via the first TRP and the reception of the uplink transmission via the second TRP.

According to some aspects, the uplink transmission may include a sounding reference signal (SRS), or another reference signal. The reference signals may be used by the base station to obtain the timing difference. According to some aspects, the downlink transmission may include an indication of at least one of: the first beam-specific timing precompensation, or the second beam-specific timing precompensation. According to some aspects, the downlink transmission may include at least one of: a signal, a UE-specific channel, or a common channel that is common to each of a plurality of UEs. According to some aspects, the downlink transmission may include at least one of: a downlink control information (DCI) or a medium access control (MAC) control element (MAC-CE) indicative of at least one of the first beam-specific timing precompensation or the second beam-specific timing precompensation. According to some aspects, the downlink transmission may include a physical downlink shared channel (PDSCH) and each data layer of the PDSCH may be associated with at least one of: a plurality of transition configuration indication (TCI) states, or a single composite TCI state representative of the plurality of TCI states. In some examples, the base station may be further configured to transmit the downlink transmission over a same time-frequency resource via the first TRP and the second TRP within a single frequency network (SFN).

FIG. 13 is a flow chart of a method of wireless communication 1300 utilizing beam-specific timing precompensation according to some aspects. In some examples, the method of wireless communication 1300 may be utilized in a single frequency network (SFN). In some examples, the method of wireless communication 1300 may be utilized in a high-speed train (HST) single frequency network (HST-SFN). As described below, some or all illustrated features may be omitted in a particular implementation within the scope of the present disclosure, and some illustrated features may not be required for implementation of all aspects. In some examples, the method of wireless communication 1300 may be performed by the base station 1100, as described herein, and illustrated in FIG. 11, by a processor or processing system, or by any suitable means for carrying out the described functions.

At block 1302, the base station may receive one or more uplink transmissions from one or more user equipment (UEs). In some examples, each of the one or more UEs may be moving at a same velocity and along a same path relative to the base station. For example, as the UE is traveling in a direction along a path (e.g., along a train track), the UE may transmit one or more uplink transmissions to a plurality of TRPs, including a first TRP and a second TRP located at positions adjacent the path. The base station may receive an uplink transmission using a first transmit beam of a first beam pair link (e.g., the first beam of the first beam pair link at the TRP that is utilized for downlink or uplink communication and is at this moment configured to receive the uplink transmission from the UE) via the first TRP, and may also receive the uplink transmission using a second transmit beam of a second beam pair link (e.g., the second beam of the second beam pair link at the TRP that is utilized for downlink or uplink communication and is at this moment configured to receive the uplink transmission from the UE) via the second TRP. In some aspects, the one or more uplink transmissions may include a sounding reference signal (SRS). The receiving circuitry 1141 together with the TRP interface 1120 and the first TRP 1121 and the second TRP 1122, as shown and described above in connection with FIG. 11, may provide a means to receive one or more uplink transmissions from one or more user equipment (UEs).

At block 1304, the base station may obtain (e.g., estimate, calculate, determine, derive) a timing difference between at least a first beam and a second beam based on the one or more uplink transmissions, where the first beam may be transmitted by a first TRP of a plurality of TRPs associated with the base station and the second beam may be transmitted by a second TRP of the plurality of TRPs associated with the base station. For example, the base station may obtain a timing difference between the reception of the first uplink beam by the first TRP and the reception of the second uplink beam by the second TRP. In one example, the base station may estimate a timing difference between the first beam for transmission by the first TRP to the UE and a second beam for transmission by the second TRP to the UE based on the timing difference between the reception of the one or more uplink transmissions from the UE by the first TRP and the reception of the one or more uplink transmissions from the UE by the second TRP. For example, the timing difference circuitry 1142, as shown and described above in connection with FIG. 11, may provide a means for obtaining a timing difference between at least a first beam and a second beam based on the one or more uplink transmissions.

At block 1306, the base station may obtain a first beam-specific timing precompensation for the first beam and a second beam-specific timing precompensation for the second beam based on the timing difference. In some aspects, in order to prevent or reduce inter-symbol interference (ISI) between a transmission of a downlink channel or signal utilizing the first beam from the first TRP and the second beam from the second TRP, the base station may obtain the first beam-specific timing precompensation for the first beam and a second beam-specific timing precompensation for the second beam based on the timing difference between the first beam and the second beam. In some examples, the base station may determine that the first beam-specific timing precompensation is to either advance or delay the downlink transmission time (e.g., of the downlink transmission, the channel, or signal) on the first beam. Similarly, the base station may determine that the second beam-specific timing precompensation is to either advance or delay in time the transmission of the downlink transmission (e.g., the channel or signal) on the second beam. Alternatively, the base station may determine that the first beam-specific timing precompensation is not to affect the transmission time of the downlink transmission on the first beam by the first TRP. Similarly, the base station may determine that the second beam-specific timing precompensation is not to affect the transmission time of the downlink transmission on the second beam by the second TRP.

In some aspects, determining the first beam-specific timing precompensation and the second beam-specific timing precompensation may include determining the first beam-specific timing precompensation and the second beam-specific timing precompensation for at least one of one or more signals, one or more UE-specific channels, or one or more common channels that are common to each UE of the plurality of UEs. For example, as described herein, an HST may include a plurality of UEs including the UE, and the first beam-specific timing precompensation and the second beam-specific timing precompensation may be for one or more signals (e.g., DM-RSs, TRSs, etc.), one or more UE-specific channels (e.g., PDCCH or PDSCH), or one or more common channels (e.g., common control information carried in a PDCCH) that are common to each of the plurality of UEs included with the HST. The beam-specific timing precompensation circuitry 1143, shown and described above in connection with FIG. 11, may provide a means of obtaining a first beam-specific timing precompensation for the first beam and a second beam-specific timing precompensation for the second beam based on the timing difference.

At block 1308, the base station may transmit an indication of at least one of the first beam-specific timing precompensation or the second beam-specific timing precompensation to at least one UE of the one or more UEs. For example, the indication of at least one of the first beam-specific timing precompensation or the second beam-specific timing precompensation may be transmitted to the at least one UE of the one or more UEs using at least one of downlink control information (DCI) or a medium access control (MAC) control element (MAC-CE). In some aspects, the indication of at least one of the first beam-specific timing precompensation or the second beam-specific timing precompensation may vary over time based on at least one of the velocity of the one or more UEs moving along the path (e.g., the path, defined by train tracks, of the HST), a position of at least one UE of the one or more UEs, or a direction of a movement of the one or more UEs along the path.

For example, when the velocity of an HST changes, the rate at which a distance changes between each of the TRPs, including the first TRP and the second TRP, and the UE varies. To accommodate this rate of distance change, the base station may modify or change one or more beam-specific timing precompensations for beams of each TRP of the plurality of TRPs positioned along the path, including the first beam-specific timing precompensation of the first beam of the first TRP and the second beam-specific timing precompensation of the second beam of the second TRP. As another example, when a position of the HST changes along the path, the position of the UE may also change along the path, causing a change in distance between each of the TRPs, including the first TRP and the second TRP and the UE. The change in distance may cause the base station to modify or change one or more beam-specific timing precompensations for beams of each TRP of the one or more TRPs positioned along the path, including the first beam-specific timing precompensation of the first beam of the first TRP and the second beam-specific timing precompensation of the second beam of the second TRP. As yet another example, when a direction of movement of the HST changes along the path, the direction of movement of the UE may change relative to each TRP, including the first TRP and the second TRP, and the UE. The change in the direction of movement may cause the base station to modify or change one or more beam-specific timing precompensations for beams of each TRP of the plurality of TRPs positioned along the path, including the first beam-specific timing precompensation of the first beam of the first TRP and the second beam-specific timing precompensation of the second beam of the second TRP. The transmitting circuitry 1144 together with the TRP interface 1120, the first TRP 1121, and the second TRP 1122, as shown and described above in connection with FIG. 11, may provide a means for transmitting an indication of at least one of the first beam-specific timing precompensation or the second beam-specific timing precompensation to at least one UE of the one or more UEs.

At block 1310, the base station may transmit a physical downlink shared channel (PDSCH) transmission through the first beam of the first TRP according to the first beam-specific timing precompensation and the second beam of the second TRP according to the second beam-specific timing precompensation. The TRPs, including the first TRP and the second TRP, may each transmit the PDSCH transmission over a same resource (e.g., time-frequency resource) using their respective beams (e.g., the first beam for the first TRP, the second beam for the second TRP) according to their respective beam-specific timing precompensations. In some examples, each data layer of the PDSCH may be associated with a plurality of transition configuration indication (TCI) states. For example, each data layer of the PDSCH may be associated with a first TCI state indicating the first beam on the first TRP, and a second TCI state indicating the second beam on the second TRP. In some examples, each data layer of the PDSCH may be associated with a single composite TCI state representative of a plurality of TCI states. For example, each data layer of the PDSCH may be associated with a TCI state that is representative of the first TCI state and the second TCI state. The transmitting circuitry 1144 together with the TRP interface 1120, the first TRP 1121, and the second TRP 1122, as shown and described above in connection with FIG. 11, may provide a means for transmitting a PDSCH transmission through the first beam of the first TRP according to the first beam-specific timing precompensation and the second beam of the second TRP according to the second beam-specific timing precompensation.

Figure 14:
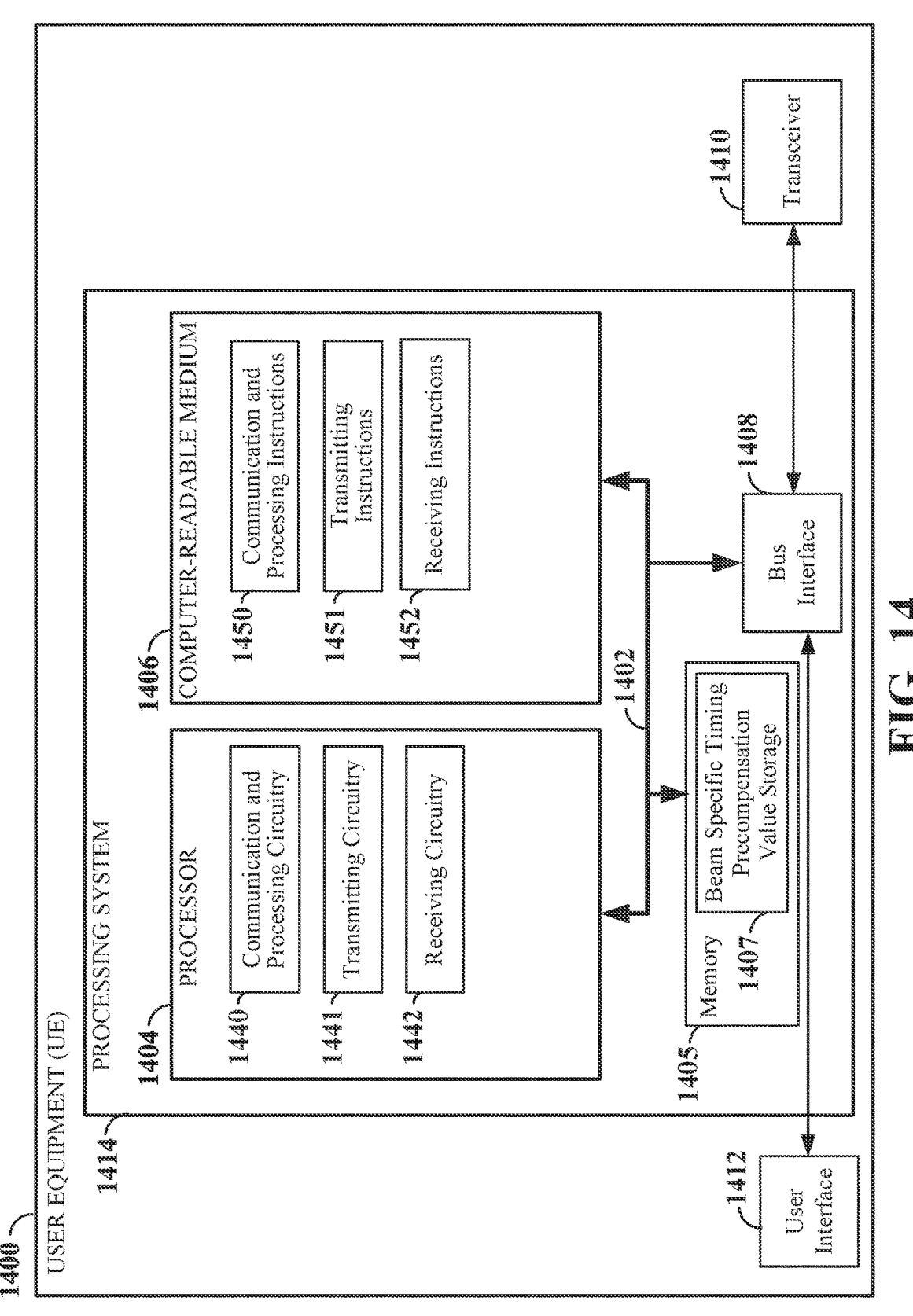
FIG. 14 is a block diagram illustrating an example of a hardware implementation of a user equipment (UE) employing a processing system according to some aspects.

FIG. 14 is a block diagram illustrating an example of a hardware implementation of a user equipment (UE) 1400 employing a processing system 1414 according to some aspects. The UE 1400 may be, for example, any UE, scheduled entity, or wireless communication device as illustrated in any one or more of FIGS. 1, 2, 4, 5, and/or 7-10. In accordance with various aspects of the disclosure, an element, or any portion of an element, or any combination of elements may be implemented with a processing system 1414 that includes one or more processors, such as processor 1404. The processing system 1414 may be substantially the same as the processing system 1114 as shown and described above in connection with FIG. 11, including a bus interface 1408, a bus 1402, a memory 1405, a processor 1404, and a computer-readable medium 1406. Furthermore, the UE 1400 may include a user interface 1412, a transceiver 1410, and antennas/antenna array (not shown), substantially similar to those described above in FIG. 11. Accordingly, their descriptions will not be repeated for the sake of brevity.

In some aspects of the disclosure, the processor 1404 may include communication and processing circuitry 1440 configured for various functions, including, for example, communicating with other UEs, TRPs, scheduling entities, or any other entity, such as, for example, local infrastructure or an entity communicating with the UE 1400 via the Internet, such as a network provider. In some examples, the communication and processing circuitry 1440 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1440 may be configured to receive and process downlink traffic and downlink control (e.g., similar to downlink traffic 142 and downlink control 144 of FIG. 1) and process and transmit uplink traffic and uplink control (e.g., similar to uplink traffic 146 and uplink control 148). The communication and processing circuitry 1440 may further be configured to execute communication and processing software 1450 stored on the computer-readable medium 1406 to implement one or more functions described herein.

In some aspects of the disclosure, the processor 1404 may include other circuitry configured for various functions. For example, the processor 1404 may include transmitting circuitry 1441 that may be configured to transmit an uplink transmission to a first transmission and reception point (TRP) of a base station on a first receive beam of a first beam pair link, and to a second TRP associated with the base station on a second receive beam of a second beam pair link. In another example, the transmitting circuitry 1441 may be configured to transmit one or more uplink transmissions to at least a first TRP and a second TRP of a plurality of TRPs of a base station. In some examples, the UE may be moving with one or more other UEs at a same velocity and along a same path relative to the first TRP and the second TRP. The transmitting circuitry 1441 may be configured to execute transmitting instructions 1451 stored in the computer-readable medium 1406 to implement any of the one or more of the functions described herein.

The processor 1404 may also include receiving circuitry 1442. In one example, the receiving circuitry 1442 may be configured to receive a downlink transmission via the first TRP on the first receive beam with a first beam-specific timing precompensation, and via the second TRP on the second receive beam with a second beam-specific timing precompensation, the first beam-specific timing precompensation and the second beam-specific timing precompensation being based on a timing difference between the reception of the uplink transmission via the first TRP and the second TRP. In another aspect, the receiving circuitry 1442 may be configured to receive a downlink transmission indicating: a first beam-specific timing precompensation that is applied to a first transmit beam of the first beam pair link, and a second beam-specific timing precompensation that is applied to a second transmit beam of the second beam pair link. In another example, the receiving circuitry 1442 may be configured to receive an indication of at least one of the first beam-specific timing precompensation of the first beam for transmission by the first TRP or a second beam-specific timing precompensation of a second beam for transmission by the second TRP. The indication of the at least one of the first beam-specific timing precompensation or the second beam-specific timing precompensation may be stored in beam-specific timing precompensation value storage 1407 location in the memory 1405, for example. Furthermore, the receiving circuitry 1442 may also be configured to receive a physical downlink shared channel (PDSCH) transmission through the first beam of the first TRP according to the first beam-specific timing precompensation and the second beam of the second TRP according to the second beam-specific timing precompensation. The receiving circuitry 1442 may further be configured to execute receiving instructions 1452 stored in the computer-readable medium 1406 to implement any of the one or more of the functions described herein.

FIG. 15 is a flow chart of a method of wireless communication 1500 utilizing beam-specific timing precompensation according to some aspects. In some examples, the method of wireless communication 1500 may be utilized in a single frequency network (SFN). In some examples, the method of wireless communication 1500 may be utilized in a high-speed train (HST) single frequency network (HST-SFN). As described below, some or all illustrated features may be omitted in a particular implementation within the scope of the present disclosure, and some illustrated features may not be required for implementation of all aspects. In some examples, the method of wireless communication 1500 may be performed by the user equipment (UE) 1400, as described herein and illustrated in FIG. 14, by a processor or processing system, or by any suitable means for carrying out the described functions.

At block 1502, the UE may transmit an uplink transmission on a first receive beam of a first beam pair link (e.g., the first beam of the first beam pair link at the UE that is utilized for downlink or uplink communication and is at this moment is configured to transmit an uplink). At block 1504, the UE may transmit the uplink transmission on a second receive beam of a second beam pair link (e.g., the second beam of the second beam pair link at the UE that is utilized for downlink or uplink communication and is at this moment is configured to transmit an uplink). The uplink transmission transmitted from the UE on the first receive beam and on the second receive beam may be simultaneous or substantially simultaneous. The uplink transmission may be transmitted, for example, to a first transmission and reception point (TRP) associated with a base station on the first receive beam of the first beam pair link, and to a second TRP associated with the base station on the second receive beam of the second beam pair link. For example, the transmitting circuitry 1441 together with the transceiver 1410, as shown and described above in connection with FIG. 14, may provide a means for transmitting an uplink transmission on a first receive beam of a first beam pair link, and may also provide a means for transmitting the uplink transmission on a second receive beam of a second beam pair link.

At block 1506, the UE may receive a downlink transmission indicating: a first beam-specific timing precompensation that may be applied to a first transmit beam of the first beam pair link (e.g., the first beam of the first beam pair link at the UE that is utilized for downlink or uplink communication and is at this moment is configured to receive a downlink), and a second beam-specific timing precompensation that may be applied to a second transmit beam of the second beam pair link (e.g., the second beam of the second beam pair link at the UE that is utilized for downlink or uplink communication and is at this moment is configured to receive a downlink). The downlink transmission may be received, for example, from a base station or respectively from a first TRP associated with the base station utilizing the first beam pair link and from a second TRP associated with the base station utilizing the second beam pair link. For example, the receiving circuitry 1442 together with the transceiver 1410, as shown and described above in connection with FIG. 14, may provide a means for receiving a downlink transmission indicating that: a first beam-specific timing precompensation may be applied to a first transmit beam of the first beam pair link, and a second beam-specific timing precompensation may be applied to a second transmit beam of the second beam pair link.

According to some aspects, the uplink transmission may include a sounding reference signal (SRS) or another reference signal. The reference signals may be used by the base station to obtain a timing difference between the reception of the uplink transmission via a first TRP and the reception of the uplink transmission via a second TRP. According to some aspects, the first beam-specific timing precompensation and the second beam-specific timing precompensation were applied (by the base station at the first TRP and the second TRP, respectively) to at least one of: a signal, a UE-specific channel, or a common channel that is common to each UE of the plurality of UEs. According to some aspects, the downlink transmission indicating the first beam-specific timing precompensation and the second beam-specific timing precompensation is within at least one of: a downlink control information (DCI), or a medium access control (MAC) control element (MAC-CE). According to some aspects, the method may also include receiving the downlink transmission on a first receive beam of the first beam pair link according to the first beam-specific timing precompensation on a first time-frequency resource, and receiving the downlink transmission on a second receive beam of the second beam pair link according to the second beam-specific timing precompensation on the first time-frequency resource.

In some examples, the method further includes receiving the downlink transmission on a first receive beam of the first beam pair link according to the first beam-specific timing precompensation on a first time-frequency resource, and receiving the downlink transmission on a second receive beam of the second beam pair link according to the second beam-specific timing precompensation on the first time-frequency resource (i.e., the same time-frequency resource).

In some examples, the method further includes receiving a physical downlink shared channel (PDSCH) on a first receive beam of the first beam pair link according to the first beam-specific timing precompensation, and receiving the PDSCH on a second receive beam of the second beam pair link according to the second beam-specific timing precompensation. According to one aspect, each data layer of the PDSCH may be associated with a plurality of transition configuration indication (TCI) states. According to another aspect, each data layer of the PDSCH may be associated with a single composite TCI state representative of a plurality of TCI states.

FIG. 16 is a flow chart of a method of wireless communication 1600 utilizing beam-specific timing precompensation according to some aspects. In some examples, the method of wireless communication 1600 may be utilized in a single frequency network (SFN). In some examples, the method of wireless communication 1600 may be utilized in a high-speed train (HST) single frequency network (HST-SFN). As described below, some or all illustrated features may be omitted in a particular implementation within the scope of the present disclosure, and some illustrated features may not be required for implementation of all aspects. In some examples, the method of wireless communication 1600 may be performed by the user equipment (UE) 1400, as described herein and illustrated in FIG. 14, by a processor or processing system, or by any suitable means for carrying out the described functions.

At block 1602, the UE may transmit one or more uplink transmissions to at least a first transmission and reception point (TRP) and a second TRP of a plurality of TRPs associated with a base station. In some aspects, the UE may be moving with one or more other UEs at a same velocity and along a same path relative to the first TRP and the second TRP. For example, as the UE is traveling in a direction along a path (e.g., along a train track), the UE may transmit one or more uplink transmissions to a plurality of TRPs, including a first TRP and a second TRP located at positions adjacent the path. The UE may transmit an uplink transmission using a first uplink beam (e.g., a first beam of a first beam pair link at the UE that is utilized for downlink or uplink communication and is at this moment is configured to transmit an uplink) to the first TRP associated with the base station, and using a second uplink beam (e.g., a second beam of a second beam pair link at the UE that is utilized for downlink or uplink communication and is at this moment is configured to transmit an uplink) to the second TRP associated with the base station. In some aspects, the one or more uplink transmissions may include a sounding reference signal (SRS). The transmitting circuitry 1441 together with the transceiver 1410, as shown and described above in connection with FIG. 14, may provide a means for transmitting one or more uplink transmissions to at least a first transmission and reception point (TRP) and a second TRP of a plurality of TRPs of a base station.

The base station may obtain (e.g., estimate, calculate, determine, derive) a timing difference between at least a first beam and a second beam based on the one or more uplink transmissions, where the first beam may be received by a first TRP associated with the base station and the second beam may be received by a second TRP associated with the base station. For example, the base station may determine the timing difference between the reception of the first uplink beam by the first TRP and the reception of the second uplink beam by the second TRP.

The base station may determine a first beam-specific timing precompensation for the first beam and a second beam-specific timing precompensation for the second beam based on the timing difference. In some aspects, in order to prevent or reduce inter-symbol interference (ISI) between a transmission of a downlink channel or signal utilizing the first beam from the first TRP and the second beam from the second TRP, the base station may obtain the first beam-specific timing precompensation for the first beam and the second beam-specific timing precompensation for the second beam based on the timing difference between the first beam and the second beam. In some examples, the base station may determine that the first beam-specific timing precompensation is to either advance or delay in time the transmission of the downlink channel or signal on the first beam. Similarly, the base station may determine that the second beam-specific timing precompensation is to either advance or delay in time the transmission of the downlink channel or signal on the second beam. Alternatively, the base station may determine that the first beam-specific timing precompensation is not to affect a transmission time of the downlink channel or signal on the first beam by the first TRP. Similarly, the base station may determine that the second beam-specific timing precompensation is not to affect a transmission time of the downlink channel or signal on the second beam by the second TRP.

In some aspects, determining the first beam-specific timing precompensation and the second beam-specific timing precompensation may include determining the first beam-specific timing precompensation and the second beam-specific timing precompensation for at least one of one or more signals, one or more UE-specific channels, or one or more common channels that are common to each UE of the plurality of UEs. For example, as described herein, an HST may include a plurality of UEs including the UE, and the first beam-specific timing precompensation and the second beam-specific timing precompensation may be for one or more signals (e.g., DM-RSs, TRSs, etc.), one or more UE-specific channels (e.g., PDCCH or PDSCH), or one or more common channels (e.g., common control information carried in a PDCCH) that are common to each of the plurality of UEs included with the HST.

At block 1604, the UE may receive an indication of at least one of the first beam-specific timing precompensation of the first beam for transmission by the first TRP or a second beam-specific timing precompensation of a second beam for transmission by the second TRP. For example, the indication of at least one of the first beam-specific timing precompensation or the second beam-specific timing precompensation may be transmitted to the at least one UE of the one or more UEs using at least one of downlink control information (DCI) or a medium access control (MAC) control element (MAC-CE). In some aspects, the indication of at least one of the first beam-specific timing precompensation or the second beam-specific timing precompensation may vary over time based on at least one of the velocity of the one or more UEs moving along the path, a position of at least one UE of the one or more UEs, or a direction of a movement of the one or more UEs along the path.

For example, when the velocity of an HST changes, the rate at which a distance changes between each of the TRPs, including the first TRP and the second TRP, and the UE varies. To accommodate this rate of distance change, the base station may modify or change one or more beam-specific timing precompensations for beams of each TRP of the plurality of TRPs positioned along the path, including the first beam-specific timing precompensation of the first beam of the first TRP and the second beam-specific timing precompensation of the second beam of the second TRP. As another example, when a position of the HST changes along the path, the position of the UE may also change along the path, causing a change in distance between each of the TRPs, including the first TRP and the second TRP, and the UE. The change in distance may cause the base station to modify or change one or more beam-specific timing pre-compensations for beams of each TRP of the one or more TRPs positioned along the path, including the first beam-specific timing precompensation of the first beam of the first TRP and the second beam-specific timing precompensation of the second beam of the second TRP. As yet another example, when a direction of movement of the HST changes along the path, the direction of movement of the UE may change relative to each TRP, including the first TRP and the second TRP, and the UE. The change in the direction of movement may cause the base station to modify or change one or more beam-specific timing precompensations for beams of each TRP of the plurality of TRPs positioned along the path, including the first beam-specific timing precom-pensation of the first beam of the first TRP and the second beam-specific timing precompensation of the second beam of the second TRP. The receiving circuitry 1442 together with the transceiver 1410, as shown and described above in connection with FIG. 14, may provide a means for receiving an indication of at least one of a first beam-specific timing precompensation of the first beam for transmission by the first TRP or a second beam-specific timing precompensation of a second beam for transmission by the second TRP.

At block 1606, the UE may receive a physical downlink shared channel (PDSCH) transmission through the first beam of the first TRP according to the first beam-specific timing precompensation and the second beam of the second TRP according to the second beam-specific timing precom-pensation. The TRPs, including the first TRP and the second TRP, may each transmit the PDSCH transmission over a same resource (e.g., time-frequency resource) using their respective beams (e.g., the first beam for the first TRP, the second beam for the second TRP) according to their respec-tive beam-specific timing precompensations. In some examples, each data layer of the PDSCH may be associated with a plurality of transition configuration indication (TCI) states. For example, each data layer of the PDSCH may be associated with a first TCI state indicating the first beam on the first TRP, and a second TCI state indicating the second beam on the second TRP. In some examples, each data layer of the PDSCH may be associated with a single composite TCI state representative of a plurality of TCI states. For example, each data layer of the PDSCH may be associated with a TCI state that is representative of the first TCI state and the second TCI state. The receiving circuitry 1442 together with the transceiver 1410, as shown and described above in connection with FIG. 11, may provide a means for receiving a physical downlink shared channel (PDSCH) transmission through the first beam of the first TRP accord-ing to the first beam-specific timing precompensation and the second beam of the second TRP according to the second beam-specific timing precompensation.

Figure 17A:
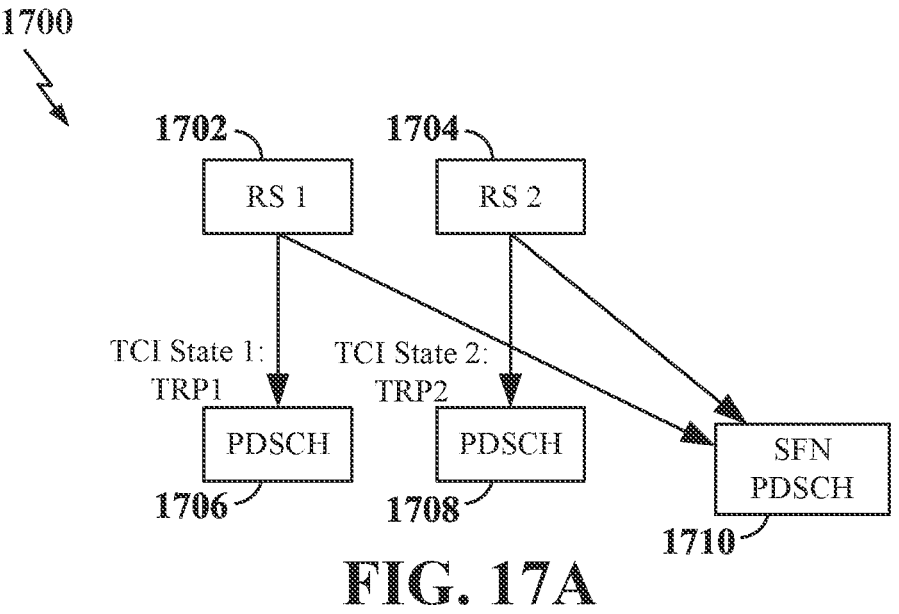
FIGS. 17A and 17B are illustrations of single frequency network configurations according to some aspects.
Figure 17B:
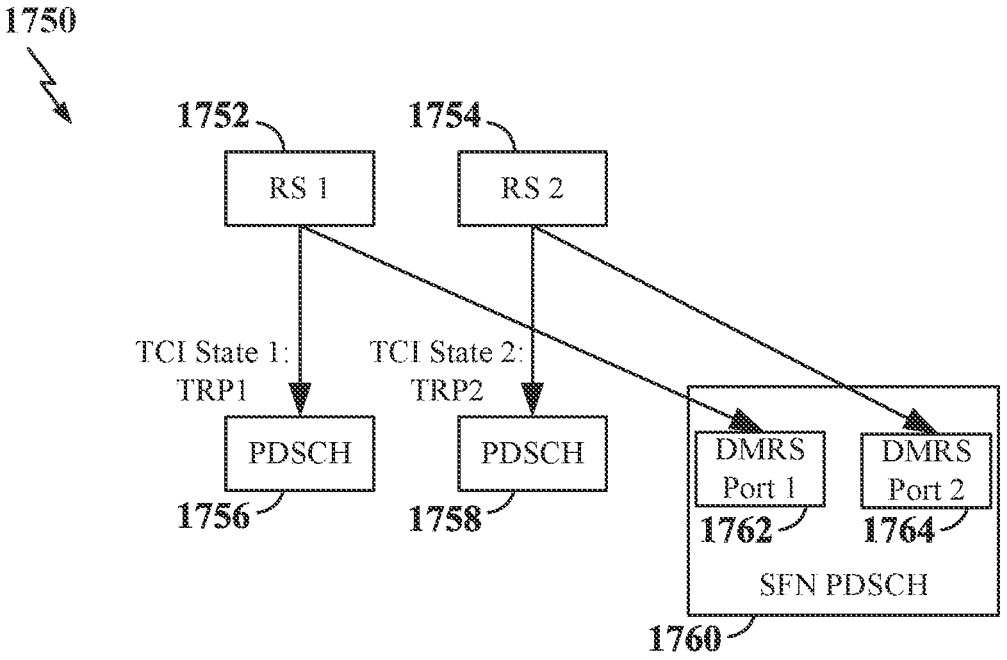

FIGS. 17A and 17B are illustrations of single frequency network (SFN) configurations according to some aspects. FIG. 17A illustrates a first SFN configuration 1700. Tracking reference signals, such as reference signal 1 (RS1) 1702 and reference signal 2 (RS2) 1704, may be transmitted in TRP-specific and/or non-SFN configurations. DM-RS and physi-cal downlink control channels (PDCCHs) and/or PDSCHs from TRPs may be transmitted in an SFN configuration. For example, TCI states associated with each of RS1 1702 and RS2 1704 may be used for transmitting a PDSCH transmis-sion. A first TCI state (e.g., first beam) associated with RS1 1702 may be used for transmitting a first PDSCH 1706 transmission by a first TRP, and a second TCI state (e.g., second beam) associated with RS2 1704 may be used for transmitting a second PDSCH 1708 transmission by a sec-ond TRP. Additionally, or alternatively, as shown in FIG. 17A, the TCI states associated with RS1 1702 and RS2 1704 may be used together in an SFN to transmit an SFN PDSCH 1710. In some aspects, each DM-RS port may be associated with both the first TCI state and the second TCI state. In some aspects, each data layer of the first PDSCH 1706, the second PDSCH 1708, and the SFN PDSCH 1710 may be associated with both the first TCI state and the second TCI state.

FIG. 17B illustrates a second SFN configuration 1750. Tracking reference signals and DM-RSs, such as RS1 1752 and RS2 1754, may be transmitted in TRP-specific and/or non-SFN configurations. PDCCHs and PDSCHs from TRPs may be transmitted in an SFN configuration. For example, the TCI states associated with each of RS1 1752 and RS2 1754 may be used for transmitting a PDSCH transmission. A first TCI state (e.g., first beam) associated with RS1 1752 may be used for transmitting a first PDSCH transmission 1756 by a first TRP, and a second TCI state (e.g., second beam) associated with RS2 1754 may be used for transmit-ting a second PDSCH transmission 1758 by a second TRP. Additionally, or alternatively, as shown in FIG. 17B, the TCI states associated with RS1 1752 and RS2 1754 may be used in an SFN so that the TCI states associated with RS1 1752 and RS2 1754 may be used for transmitting an SFN PDSCH 1760. In addition, since the DM-RS is transmitted in a non-SFN manner, separate DM-RSs may be transmitted by the TRPs, and each may be associated with a different DM-RS port 1762, 1764. In some aspects, each DM-RS port 1762, 1764 may be associated with either the first TCI state or the second TCI state. In some aspects, each data layer of the SFN PDSCH 1760 may be associated with both the first TCI state and the second TCI state.

FIG. 18 is an illustration of a single frequency network configuration 1800 according to some aspects. As shown in FIG. 18, a first TCI state (TCI State 1) associated with a first reference signal (RS1) 1802 of a first TRP may be used for transmitting a first PDSCH 1808 and a second TCI state (TCI State 2) associated with a second reference signal (RS2) 1804 of a second TRP may be used for transmitting a second PDSCH 1810. Additionally, or alternatively, the TCI states associated with RS1 1802 and the RS2 1804 may be combined into a composite TCI state (TCI State 3) associated with a single frequency network (SFN) reference signal (SFN-RS) 1806 that represents a spatial combination of both the first TCI state (e.g., a first beam on the first TRP) and the second TCI state (e.g., a second beam on the second TRP). The SFN-RS 1806 may be used to transmit an SFN PDSCH 1812. In some aspects, using this configuration, a UE may not know whether an SFN signal is used and whether or not the third TCI state is composed of two beams. In some aspects, additional SFN-RS resources (e.g., channel state information (CSI) reference signals (CSI-RSs) and tracking reference signals (TRS) may be configured for the UE utilizing an SFN (composite) configuration.

Of course, in the above examples, the circuitry included in the processor 1104 and/or the processor 1404 is merely provided as an example, and other means for carrying out the described functions may be included within various aspects of the present disclosure, including but not limited to the instructions stored in the computer-readable medium 1106, 1406 or any other suitable apparatus or means described in any one of the FIGS. 1, 2, 4, 5, 7-11, 14, 17A, 17B, and/or 18, and utilizing, for example, the processes and/or algorithms described herein in relation to FIGS. 6, 8, 9, 10, 12, 13, 15, and/or 16.

The following provides an overview of aspects of the present disclosure:

Aspect 1: A method of wireless communication at a base station, the method comprising: receiving, via a first transmission and reception point (TRP) associated with the base station, an uplink transmission on a first transmit beam of a first beam pair link, receiving, via a second TRP associated with the base station, the uplink transmission on a second transmit beam of a second beam pair link; transmitting, via the first TRP, a downlink transmission on the first transmit beam with a first beam-specific timing precompensation; and transmitting, via the second TRP, the downlink transmission on the second transmit beam with a second beam-specific timing precompensation, wherein the first beam-specific timing precompensation and the second beam-specific timing precompensation are based on a timing difference between the reception of the uplink transmission via the first TRP and the reception of the uplink transmission via the second TRP.

Aspect 2: The method of aspect 1, wherein the uplink transmission comprises a sounding reference signal (SRS).

Aspect 3: The method of aspect 1 or 2, wherein the downlink transmission comprises an indication of at least one of: the first beam-specific timing precompensation, or the second beam-specific timing precompensation.

Aspect 4: The method of any of aspects 1 through 3, wherein the downlink transmission comprises at least one of: a signal, a UE-specific channel, or a common channel that is common to each of a plurality of UEs.

Aspect 5: The method of any of aspects 1 through 4, wherein the downlink transmission comprises at least one of: a downlink control information (DCI), or a medium access control (MAC) control element (MAC-CE) indicative of at least one of the first beam-specific timing precompensation or the second beam-specific timing precompensation.

Aspect 6: The method of any of aspects 1 through 5, wherein the downlink transmission is a physical downlink shared channel (PDSCH) and each data layer of the PDSCH is associated with at least one of: a plurality of transition configuration indication (TCI) states, or a single composite TCI state representative of the plurality of TCI states.

Aspect 7: The method of any of aspects 1 through 6, wherein the downlink transmission is transmitted over a same time-frequency resource via the first TRP and the second TRP within a single frequency network (SFN).

Aspect 8: A base station for wireless communication, comprising: a memory, and a processor communicatively coupled to the memory, the processor and the memory being configured to: receive, via a first transmission and reception point (TRP) associated with the base station, an uplink transmission on a first transmit beam of a first beam pair link, receive, via a second TRP associated with the base station, the uplink transmission on a second transmit beam of a second beam pair link, transmit, via the first TRP, a downlink transmission on the first transmit beam with a first beam-specific timing precompensation; and transmit, via the second TRP, the downlink transmission on the second transmit beam with a second beam-specific timing precompensation, wherein the first beam-specific timing precompensation and the second beam-specific timing precompensation are based on a timing difference between the reception of the uplink transmission via the first TRP and the reception of the uplink transmission via the second TRP.

Aspect 9: The base station of aspect 8, wherein the uplink transmission comprises a sounding reference signal (SRS).

Aspect 10: The base station of aspect 8 or 9, wherein the downlink transmission comprises an indication of at least one of: the first beam-specific timing precompensation, or the second beam-specific timing precompensation.

Aspect 11: The base station of any of aspects 8 through 10, wherein the downlink transmission comprises at least one of: a signal, a UE-specific channel, or a common channel that is common to each of a plurality of UEs.

Aspect 12: The base station of any of aspects 8 through 11, wherein the downlink transmission comprises at least one of: a downlink control information (DCI), or a medium access control (MAC) control element (MAC-CE) indicative of at least one of the first beam-specific timing precompensation or the second beam-specific timing precompensation.

Aspect 13: The base station of any of aspects 8 through 12, wherein the downlink transmission is a physical downlink shared channel (PDSCH) and each data layer of the PDSCH is associated with at least one of: a plurality of transition configuration indication (TCI) states, or a single composite TCI state representative of the plurality of TCI states.

Aspect 14: The base station of any of aspects 8 through 13, wherein the downlink transmission is transmitted over a same time-frequency resource via the first TRP and the second TRP within a single frequency network (SFN).

Aspect 15: A method of wireless communication at a user equipment (UE), the method comprising: transmitting an uplink transmission on a first receive beam of a first beam pair link; transmitting the uplink transmission on a second receive beam of a second beam pair link, and receiving a downlink transmission indicating: a first beam-specific timing precompensation that is applied to a first transmit beam of the first beam pair link, and a second beam-specific timing precompensation that is applied to a second transmit beam of the second beam pair link.

Aspect 16: The method of aspect 15, wherein the uplink transmission comprises a sounding reference signal (SRS).

Aspect 17: The method of aspect 15 or 16, wherein the first beam-specific timing precompensation and the second beam-specific timing precompensation were applied to at least one of: a signal, a UE-specific channel, or a common channel that is common to each UE of a plurality of UEs.

Aspect 18: The method of any of aspects 15 through 17, further comprising: receiving the downlink transmission indicating the first beam-specific timing precompensation and the second beam-specific timing precompensation within at least one of: a downlink control information (DCI), or a medium access control (MAC) control element (MAC-CE).

Aspect 19: The method of method of any of aspects 15 through 18, further comprising: receiving the downlink transmission on the first receive beam of the first beam pair link according to the first beam-specific timing precompensation on a first time-frequency resource; and receiving the downlink transmission on the second receive beam of the second beam pair link according to the second beam-specific timing precompensation on the first time-frequency resource.

Aspect 20: The method of any of aspects 15 through 19, further comprising: receiving a physical downlink shared channel (PDSCH) on the first receive beam of the first beam pair link according to the first beam-specific timing precompensation, and receiving the PDSCH on the second receive beam of the second beam pair link according to the second beam-specific timing precompensation.

Aspect 21: The method of method of any of aspects 15 through 20, wherein each data layer of the PDSCH is associated with a plurality of transition configuration indication (TCI) states.

Aspect 22: The method of any of aspects 15 through 21, wherein each data layer of the PDSCH is associated with a single composite TCI state representative of a plurality of TCI states.

Aspect 23: A user equipment (UE) for wireless communication, comprising: a transceiver, a memory, and a processor communicatively coupled to the transceiver and the memory, the processor and the memory configured to: transmit an uplink transmission on a first receive beam of a first beam pair link; transmit the uplink transmission on a second receive beam of a second beam pair link, and receive a downlink transmission indicating: a first beam-specific timing precompensation that is applied to a first transmit beam of the first beam pair link, and a second beam-specific timing precompensation that is applied to a second transmit beam of the second beam pair link.

Aspect 24: The UE of aspect 23, wherein the uplink transmission comprises a sounding reference signal (SRS).

Aspect 25: The UE of aspect 23 or 24, wherein the first beam-specific timing precompensation and the second beam-specific timing precompensation were applied to at least one of: a signal, a UE-specific channel, or a common channel that is common to each UE of a plurality of UEs.

Aspect 26: The UE of any of aspects 23 through 25, wherein the downlink transmission indicating the first beam-specific timing precompensation and the second beam-specific timing precompensation is received within at least one of: a downlink control information (DCI), or a medium access control (MAC) control element (MAC-CE).

Aspect 27: The UE of any of aspects 23 through 26, wherein the processor and the memory are further configured to: receive the downlink transmission on the first receive beam of the first beam pair link according to the first beam-specific timing precompensation on a first time-frequency resource; and receive the downlink transmission on the second receive beam of the second beam pair link according to the second beam-specific timing precompensation on the first time-frequency resource.

Aspect 28: The UE of any of aspects 23 through 27, wherein the processor and the memory are further configured to: receive a physical downlink shared channel (PDSCH) on the first receive beam of the first beam pair link according to the first beam-specific timing precompensation; and receive the PDSCH on the second receive beam of the second beam pair link according to the second beam-specific timing precompensation.

Aspect 29: The UE of any of aspects 23 through 28, wherein each data layer of the PDSCH is associated with a plurality of transition configuration indication (TCI) states.

Aspect 30: The UE of any of aspects 23 through 29, wherein each data layer of the PDSCH is associated with a single composite TCI state representative of a plurality of TCI states.

Aspect 31: An apparatus configured for wireless communication comprising at least one means for performing a method of any one of aspects 1 through 7 or 15 through 22.

Aspect 32: A non-transitory computer-readable medium storing computer-executable code, comprising code for causing an apparatus to perform a method of any one of aspects 1 through 7 or 15 through 22.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B. and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 2, 4, 5, 7-11, 14, 17A, 17B, and/or 18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. The construct A and/or B is intended to cover A, B. and A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a base station, the method comprising:

receiving, via a first transmission and reception point (TRP) associated with the base station, an uplink transmission on a first transmit beam of a first beam pair link;

receiving, via a second TRP associated with the base station, the uplink transmission on a second transmit beam of a second beam pair link;

transmitting, via the first TRP, a high speed train-single frequency network (HST-SFN) downlink transmission on the first transmit beam with a first beam-specific timing precompensation; and transmitting, via the second TRP, the HST-SEN downlink transmission on the second transmit beam with a second beam-specific timing precompensation, wherein the first beam-specific timing precompensation and the second beam-specific timing precompensation are based on a timing difference between the reception of the uplink transmission via the first TRP and the reception of the uplink transmission via the second TRP, and wherein the HST-SFN downlink transmission comprises a common channel having the first and the second beam-specific timing precompensation, wherein the common channel is common to each of a plurality of user equipments (UEs) sharing a same velocity, acceleration, and direction of movement in the HST-SFN.

2. A base station for wireless communication, comprising:

one or more memories; and one or more processors coupled to the one or more memories, the one or more processors being configured to:

receive, via a first transmission and reception point (TRP) associated with the base station, an uplink transmission on a first transmit beam of a first beam pair link;

receive, via a second TRP associated with the base station, the uplink transmission on a second transmit beam of a second beam pair link, transmit, via the first TRP, a high speed train-single frequency network (HST-SFN) downlink transmission on the first transmit beam with a first beam-specific timing precompensation; and transmit, via the second TRP, the HST-SFN downlink transmission on the second transmit beam with a second beam-specific timing precompensation, wherein the first beam-specific timing precompensation and the second beam-specific timing precompensation are based on a timing difference between the reception of the uplink transmission via the first TRP and the reception of the uplink transmission via the second TRP, and wherein the HST-SFN downlink transmission comprises a common channel having the first and the second beam-specific timing precompensation, wherein the common channel is common to each of a plurality of user equipments (UEs) that share a same velocity, acceleration, and direction of movement in the HST-SFN.

3. The base station of claim 2, wherein the uplink transmission comprises a sounding reference signal (SRS).

4. The base station of claim 2, wherein the HST-SFN downlink transmission comprises an indication of at least one of: the first beam-specific timing precompensation, or the second beam-specific timing precompensation.

5. The base station of claim 2, wherein the HST-SFN downlink transmission comprises at least one of: a downlink control information (DCI), or a medium access control (MAC) control element (MAC-CE) indicative of at least one of the first beam-specific timing precompensation or the second beam-specific timing precompensation.

6. The base station of claim 2, wherein the HST-SFN downlink transmission is a physical downlink shared channel (PDSCH) and each data layer of the PDSCH is associated with at least one of: a plurality of transition configuration indication (TCI) states, or a single composite TCI state representative of the plurality of TCI states.

7. The base station of claim 2, wherein the HST-SFN downlink transmission is transmitted over a same time-frequency resource via the first TRP and the second TRP within the HAT-SFN.

8. A method of wireless communication at a user equipment (UE), the method comprising:

transmitting an uplink transmission on a first receive beam of a first beam pair link;

transmitting the uplink transmission on a second receive beam of a second beam pair link;

receiving a high speed train-single frequency network (HST-SFN) downlink transmission indicating:

a first beam-specific timing precompensation that is applied to a first transmit beam of the first beam pair link, and a second beam-specific timing precompensation that is applied to a second transmit beam of the second beam pair link; and applying the first beam-specific timing precompensation and the second beam-specific timing precompensation to the HST-SFN downlink transmission of a common channel according to the first and the second beam-specific timing precompensation, wherein the common channel is common to each UE of a plurality of UEs including the UE, wherein the plurality of UEs share a same velocity, acceleration, and direction of movement in the HST-SFN.

9. A user equipment (UE) for wireless communication, comprising:

one or more memories; and one or more processors coupled to the one or more memories, the one or more processors configured to:

transmit an uplink transmission on a first receive beam of a first beam pair link, transmit the uplink transmission on a second receive beam of a second beam pair link, receive a high speed train-single frequency network (HST-SFN) downlink transmission indicating:

a first beam-specific timing precompensation that is applied to a first transmit beam of the first beam pair link, and a second beam-specific timing precompensation that is applied to a second transmit beam of the second beam pair link, and apply the first beam-specific timing precompensation and the second beam-specific timing precompensation to the HST-SFN downlink transmission of a common channel according to the first and the second beam-specific timing precompensation, wherein the common channel is common to each UE of a plurality of UEs including the UE, wherein the plurality of UEs share a same velocity, acceleration, and direction of movement in the HST-SFN.

10. The user equipment of claim 9, wherein the uplink transmission comprises a sounding reference signal (SRS).

11. The user equipment of claim 9, wherein the one or more processors are further configured to:

receive the HST-SFN downlink transmission indicating the first beam-specific timing precompensation and the second beam-specific timing precompensation within at least one of: a downlink control information (DCI), or a medium access control (MAC) control element (MAC-CE).

12. The user equipment of claim 9, wherein the one or more processors are further configured to:

receive the HST-SFN downlink transmission on the first receive beam of the first beam pair link according to the first beam-specific timing precompensation on a first time-frequency resource; and receive the HST-SFN downlink transmission on the second receive beam of the second beam pair link according to the second beam-specific timing precompensation on the first time-frequency resource.

13. The user equipment of claim 9, wherein the one or more processors are further configured to:

receive a physical downlink shared channel (PDSCH) on the first receive beam of the first beam pair link according to the first beam-specific timing precompensation, and receive the PDSCH on the second receive beam of the second beam pair link according to the second beam-specific timing precompensation.

14. The user equipment of claim 13, wherein each data layer of the PDSCH is associated with a plurality of transition configuration indication (TCI) states.

15. The user equipment of claim 13, wherein each data layer of the PDSCH is associated with a single composite transition configuration indication (TCI) state representative of a plurality of TCI states.

16. The base station of claim 2, wherein the first beam-specific timing precompensation and the second beam-specific timing precompensation are further used to precompensate one or more user equipment (UE)-specific downlink control information (DCI) carried within a physical downlink control channel (PDCCH) that is specific to a particular UE within a high speed train transporting the plurality of UEs.

17. The user equipment of claim 9, wherein the first beam-specific timing precompensation and the second beam-specific timing precompensation are further used to precompensate one or more UE-specific downlink control information (DCI) carried within a physical downlink control channel (PDCCH) that is specific to the UE within a high speed train transporting the plurality of UEs.

\* \* \* \* \*